US009445360B2

(12) United States Patent
Marimuthu

(10) Patent No.: US 9,445,360 B2
(45) Date of Patent: Sep. 13, 2016

(54) METHOD AND SYSTEM FOR PROVIDING GLOBAL MULTILINE ROAMING

(71) Applicant: Verizon Patent and Licensing Inc., Arlington, VA (US)

(72) Inventor: Ramesh Marimuthu, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/573,751

(22) Filed: Dec. 17, 2014

(65) Prior Publication Data

US 2016/0183178 A1 Jun. 23, 2016

(51) Int. Cl.
*H04W 48/18* (2009.01)
*H04W 8/02* (2009.01)
*H04W 60/00* (2009.01)

(52) U.S. Cl.
CPC ............... *H04W 48/18* (2013.01); *H04W 8/02* (2013.01); *H04W 60/00* (2013.01)

(58) Field of Classification Search
CPC .............................. H04W 8/183; H04W 48/18
USPC ....................... 455/432.1–432.3, 456.1–456.5
See application file for complete search history.

(56) References Cited

U.S. PATENT DOCUMENTS

| 2011/0081906 A1* | 4/2011 | Jiang | H04W 8/26 455/433 |
| 2014/0031035 A1* | 1/2014 | Tagg | H04W 8/04 455/433 |

* cited by examiner

*Primary Examiner* — Michael T Vu

(57) ABSTRACT

An approach is provided for global multiline roaming. A global roaming multiline platform provisions a communication device with a plurality of communication access numbers respectively associated with a plurality of communication service regions, wherein the plurality of communication access numbers are associated with a single subscriber identity module (SIM) of the communication device. The platform also selects a target communication access number from among the plurality of communication access numbers for relaying a communication session to or from the communication device based on a location of the communication device, a location of a called device, a location of a calling device, or a combination thereof with respect to the plurality of communication service regions.

20 Claims, 16 Drawing Sheets

METHOD AND SYSTEM FOR PROVIDING GLOBAL MULTILINE ROAMING

BACKGROUND INFORMATION

Modern communication users (e.g., employees or consumers who use cellular services, mobile data services, and/or any other communication services) have greater mobility to travel throughout the globe. In many cases, such travel take users across communication service boundaries, thereby requiring users to make potentially complex and/or costly arrangements to remain in communication. Historically, users who travel extensively often may have to make complex or burdensome agreements to maintain communications. For example, users may have to enter into potentially expensive roaming agreements or otherwise use multiple devices, Subscriber Identity Modules (SIMs), accounts, and the like to maintain communications. As a result, service providers and device manufacturers face significant technical challenges to facilitating communications for such global travelers. Therefore, there is a need for an intelligent global calling or other communication service solution.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, software, and system for providing intelligent global calling solution are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

In what follows, for illustration purposes, examples are given where the main scenario involves a user of a mobile device visiting countries other his/hers and the methods and systems provided relate to the interrelation between the networks in the visited countries and the home country. However, it is obvious that methods and systems introduced here can or may be employed in other travel or roaming related scenarios. Additionally, generally, by a call (unless otherwise stated) is meant a data, voice, short message, or any other form connection establishment in appropriate context. Various embodiments are capable of proving services associated with voice, various forms of data and IP traffic, and short messaging and other forms of instant messaging systems.

Figure 1:
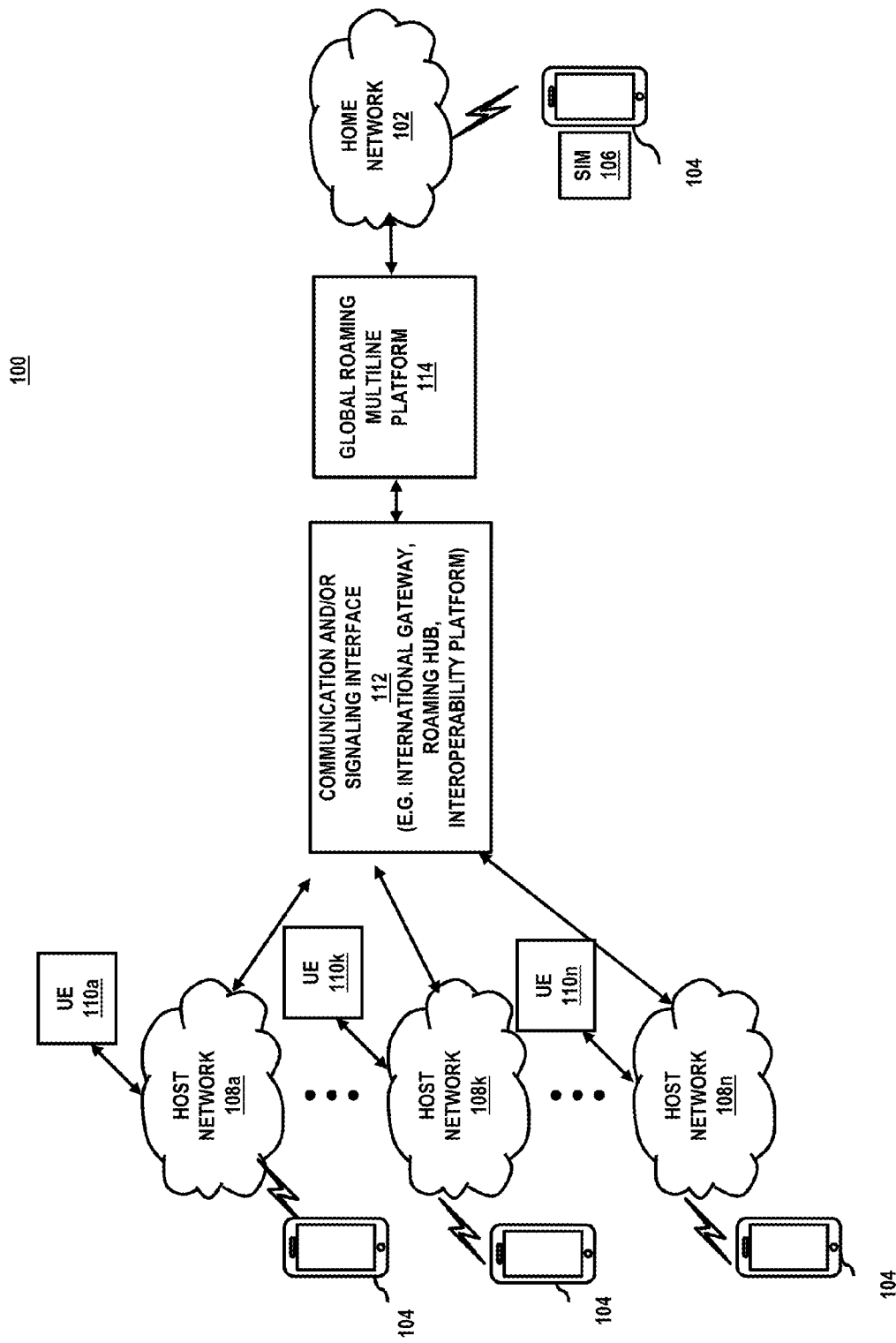
FIG. 1 is a diagram of a system capable of providing global roaming multiline service and system (e.g., for voice, data, short messaging services), according to one embodiment.

FIG. 1 is a diagram of a system capable of providing global multiline roaming and calling, according to one embodiment. As discussed above, increased mobility and travel among consumers, employees, etc. has resulted in potential difficulties for maintaining efficient and cost-effective communications. For example, as people travel more internationally, there is a need on the part of telecommunication service providers to provide connectivity to users when they travel abroad or outside of their home networks. Historically, service providers have offered roaming services (e.g., international roaming services) to travelers. However, compared with the same communication services offered on a home network, roaming services are often quite costly (e.g., for various technological, logistical, and/or regulatory reasons). Consequently, many customers avoid roaming services as much as possible and resort to solutions such as using multiple Subscriber Identity Module (SIM) cards or handsets (e.g., one for each region or service area being visited). Maintaining multiple SIMs or handsets potentially can be inconvenient in terms of routing calls appropriately between different local numbers, paying multiple bills, transferring data among phones or SIMs, etc.

In one example scenario, it is noted that American corporate employees may often travel around the world on a regular basis. These employees also typically spend most of their time in a handful of destinations conducting business. Many of these employees carry multiple phones (e.g., three to four phones)—one for each country and pay multiple bills although they normally use those phones only when they are in that specific country. In other cases, some employees carry one phone as they travel around the world, and pay typically high international roaming charges for usage (e.g., per minute, per data allotment, per text, etc.) for the convenience.

This example scenario can be illustrated with the components of FIG. 1. For example, as shown in FIG. 1, a communication network 102 is the home network to a mobile communication device 104. In one embodiment, the home network 102 can be based on various technologies such as Global System for Mobile communications (GSM), Code Division Multiple Access (CDMA), Long-Term Evolution (LTE), etc. The device 104 is registered with the home network 102. The device 104 itself typically may have various identifiers in the network, e.g., International mobile Subscriber Identity (IMSI), Mobile Directory Number (MDN), Mobile Station Integrated Services Digital Network Number (MSISDN), International Mobile Equipment Identifier (IMEI), mobile equipment identifier (MEID), etc. In some embodiments, a network unique identification number usually (IMSI) may be stored in the device, typically in a removable SIM card or part of the Removable User Identity Module (R-UIM).

Often a subscriber associated with the device 104 wants to visit distant regions (e.g., country, group of countries, geographical subdivision within a country, etc.) that may be outside of a service area of the home network 102. To support this, an operator of the home network 102 may have bi-lateral roaming agreements with the networks 108a-n (e.g., service networks operating within visited regions) which amount to the device 104 being operable with the same identification number or access as in home network 102. In this case, if the subscriber calls (or receives a call from) a party with user equipment (UE) 110a-n, the subscriber's identity (e.g., number) associated with home network will appear on the UE 109 as, for instance, caller identification information. In one embodiment, the number that will appear as caller identification information can be the identifier of the device 104 at the home network 102.

Generally, such a roaming service (based on roaming agreements or roaming hubs) can be quite expensive. An important reason is that the seemingly local communication between device 104 and 110a is going to be routed back to the home network 102 and relayed to network 108a and this, in fact, needs quite complicated signaling and control procedures. Another reason could be a difference in network structure and technologies between the host and home networks. For example, network 102 could be a CDMA network while 108a could be a GSM network (the device 104 may be GSM-enabled). In this case signaling and control between the two networks may need an interoperability platform. Therefore, a communication and/or signaling or switching interface is employed to couple the home network 102 and the host networks 108. Such an interface could include e.g., international gateway, roaming hub, interoperability platform, satellite or fiber optics links, etc.).

Overall a result of such layers of network/interface and long distances is that roaming service can be an expensive service and many people who travel around world regularly (e.g., corporate employees) tend to avoid such services because of the potential expense. Instead, many of these users may try to purchase local SIMs or devices, while roaming and may swap SIMs or devices for each country or region visited. When using multiple SIMs, for instance, users may buy bulky dual-SIM phones and leave their favorite device at home. Moreover, in such solutions only one number at any given point of time is generally available, and the subscriber typically is not reachable on home number when alternate SIMs are active.

To address these problems, a system 100 of FIG. 1 introduces a capability to provision multiple local service accounts to the device 104 or a single SIM associated with the devices. In one embodiment, one of the local service accounts can be designated as the primary account based on the location of the device 104, while the other accounts remain active and calls or communications directed to those accounts can be routed to the device 104. In this way, travelers may carry only one mobile device 104 and/or SIM and avoid paying potentially high international roaming charges while maintaining a local phone number for each country. For example, according to some embodiments, a global roaming multiline (GRM) platform 114 is provided which enables the device 104 to appear local (e.g., with access number local) to each country or host network 108 visited by the subscriber. The platform 114 may as well be called SIMM-R standing for Single IMSI Multiple MSISDN (Roaming)

To appear local, in this context, the device 104, e.g., registers with a local service provider that has been previously provisioned by checking the devices location with a region or a host network 108 and registering as a local device 104 with the host network 108. In one embodiment, roaming profiles with respect to the other provisioned accounts (e.g., from the home network 102 and/or other host networks 108) can then be updated to point to the device 104 as registered in the host network 108. In one other words, the system 100, as discussed with respect to the various embodiments described herein, provides a network-based solution for local device registration and roaming by intelligently routing and registering among multiple provisioned networks 108 available to the device 104 based on location. Further embodiments and features of the global roaming multiline platform 114 are discussed below with respect to FIG. 2.

According to one embodiment, the device 104 may be provisioned a permanent local (access) number in each destination or region of choice (e.g., each network 108a-n). As a result, the subscriber will demonstrate and experience local presence to local business partners/peers. The convenience of a single SIM and single handset can reduce the technical and cost burdens traditionally associated with international roaming for communication services. For example, in one embodiment, the subscriber can be reachable on all provisioned local numbers at the same time. In some embodiments, the subscriber may have lower roaming rates in destinations of choice and deal with a single bill from home operator (e.g., when the home operator have prior provisioning and account agreements with local host networks 108). Overall the subscriber can experience seamless and improved global connectivity at affordable prices.

At the same time the embodiments of the invention benefit the network carriers or operators in various ways by, e.g., providing high-end offerings to most profitable, high average revenue per unit (ARPU) subscribers, increasing customer stickiness, acquisition of new customers, stimulating roaming usage, keeping subscribers within partner networks, leveraging existing partnerships and evaluating future ones, converting part of variable roaming revenue to assured subscription-based revenue, and finally maintaining industry leadership and increase competitive advantage.

Figure 2:
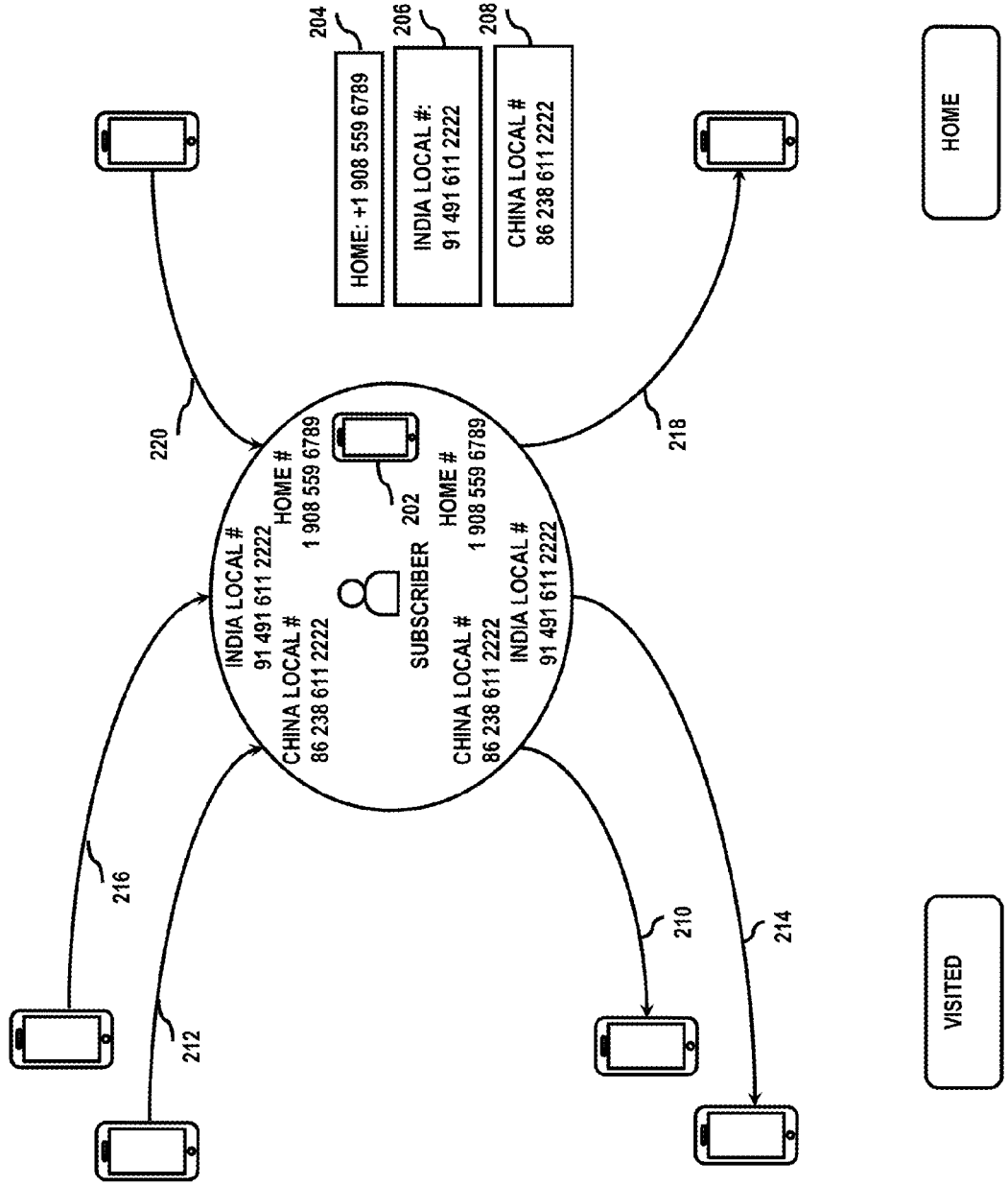
FIG. 2 is a diagram illustrating an example of providing global roaming multiline service, according to one embodiment.

FIG. 2 is a diagram illustrating an example of providing global calling, according to one embodiment. In the example of FIG. 2, the home network for the mobile device 202 is a US-based network where a US access number 204 is given. It is noted that the US-based home network 202 is provided as an example and not as a limitation. It is contemplated that any network 202 from any region or country may be designated as a home network. According to various embodiments, the subscriber may request a global calling service to be activated, e.g., for destinations India and China. Upon activation of the global calling service, local access numbers (e.g., MDN) in India 206 and China 208 (or another other countries or regions selected by the user) are provisioned as local accounts with respect to the respective host networks. Such numbers may have been acquired through prior agreements with respective operators in those countries or provided directly by the respective operators or service providers themselves.

In one embodiment, provisioning includes, for instance, establishing a local account and having a local access or network number (e.g., phone number) assigned to that account. For example, provisioning a local account enables the device 104 to register locally at the local host network (i.e., after registration the device will have a local network, identification, or access number). In this respect, the device 104 will appear as a native device within the local host network. When operating outside of the local host network (e.g., when receiving or making calls to devices outside of the local host network), the system 100 enables a roaming profile to update routing for all other provisioned local numbers associated with the device, so that calls and/or communications directed to any of the provisioned local numbers will be properly routed to the device at its current local host network.

In one embodiment, the system 100 can be configured so that caller identification information displayed when making or receiving calls can show either the number associated with the current local host network, the device's home network, or any of the other provisioned local access numbers (e.g., phone numbers). In one embodiment, the caller identification number to display is based on the current location of the device, the location of the calling or called party, or any other criteria configured by the user, the service operator, or a combination thereof. It is contemplated that the platform 114 and/or the user can use any rule, criteria, preference, etc. to specify which caller identification number to display to which called or calling parties. The examples below illustrate example embodiments of global caller identification in operation and are not intended as limitations.

As shown in FIG. 2, when the user lands in China during the first time registration (e.g., when the device sends a -Update Location (UL)-message to the network in China), according to various embodiments, the platform 114 (e.g., implemented as a new user profile server in some embodiments) looks at the user's custom profile and realizes that the user is in China, it will therefore force the network components to use the number (i.e., MDN/MSISDN) that is local to the Chinese carrier. Likewise, if the user lands in India, it may use the access number local to India. Hence in all destinations (designated service regions or countries) the device 202 will be accessible by visited-location contacts via visited (local access) numbers. In some embodiments, the user may be able to request service activation upon arrival to the destination and the local number may be provisioned on an over-the-air (OTA) basis. For example, if a local host network detects that the device has not registered using a local account, the platform 114 can determine whether the device is eligible for the global calling service and then send a message (e.g., a text message, voice message, email message, etc.) to the user to indicate the availability of the global calling service and/or instructions for initiating the global calling service. In some embodiments, the message may direct the user to specific local carriers or operators if there are multiple operators available to choose from.

According to some embodiments, when the user is in China and calls or sends SMS messages to party with a local number (call/SMS 210), the network automatically displays/presents the local MDN as the caller ID, and the user will pay the local call/SMS charges because from a network perspective, this call/SMS will be routed completely locally instead of being routed to the home country and then routed back to the visited country per the current traditional roaming practice. Similarly, when the subscriber receives a call/SMS from a local number (call/SMS 212) the call/SMS will be treated locally at lower rates. The same situation holds in India (calls/SMSs 214 and 216).

Additionally, a local MDN/MSISDN also allows the user to keep a local persona in the visited country. This local persona, for instance, can increase and/or maintain a better relationship or presence with user's customers/partners in the visited country even when the user is not physically in the country or region. By way of example, the local MDN can invite more frequent calls locally, because local customers/partners will not pay international calling charges when they call the subscriber. This ultimately can increase business productivity.

When the user is in a visited country, but calls or is called by a party (or sends/receives SMS to/from a party) at the home country, the caller ID will now show the home country number (calls/SMSs 218 and 220). According to some embodiments, when the subscriber is in China but calls a number in India, the network will show the user's local MDN in India.

According to various embodiments, Mobile Originated call (and SMS) capability from both home and visited/local numbers will be maintained. Similarly, according to certain embodiments the device 202 may be reachable on both home and visited/local numbers concurrently. According to some embodiments, the subscriber will be able to use a single primary handset, SIM, phone book, message inbox, etc. within a unified experience in all (regions) destinations.

In some embodiments, the platform 114 may specify billing/charging mechanisms and/or subscriptions to support the global calling service. For example, according to some embodiments, a subscriber purchases specific travel/roaming plans for a set of destinations. The subscriber may be provisioned in a centralized multi-line platform for roaming "local" numbers. Furthermore, the subscriber is notified of service activation. Subsequently, the subscriber will be reachable through local access numbers available in different destinations. The subscriber may pay monthly subscription fees together with specialized rates (which can be considerably cheaper than regular roaming) for receiving calls/SMS on these roaming "local" numbers. All services on home number stay available and unaffected. Local access numbers will be available in multiple countries to receive calls/SMS. When roaming, the local access number can make calls/send SMS at specialized rates. In one embodiment, the local access numbers can be provisioned permanently or temporarily for a duration (e.g., a duration of a planned trip).

Figure 3B:
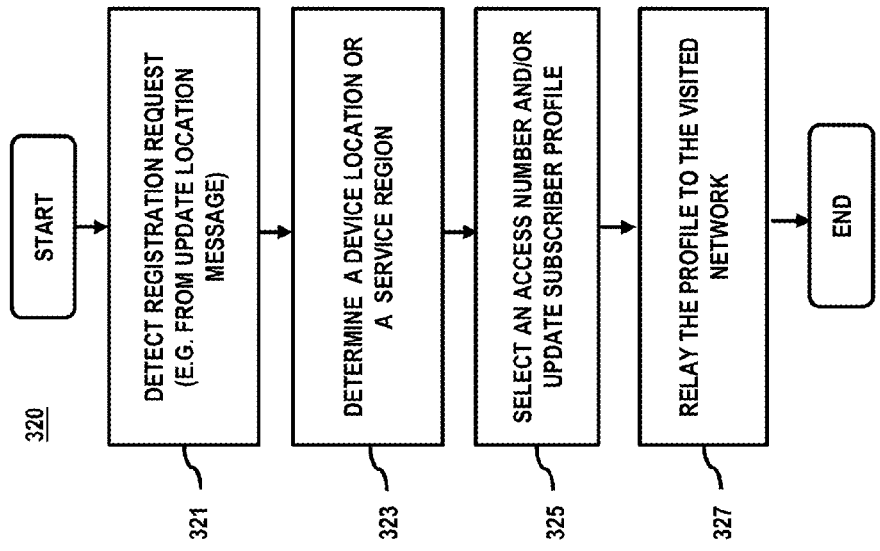
FIGS. 3A-B are flowcharts of the processes for providing global roaming multiline service, according various embodiments.
Figure 3A:
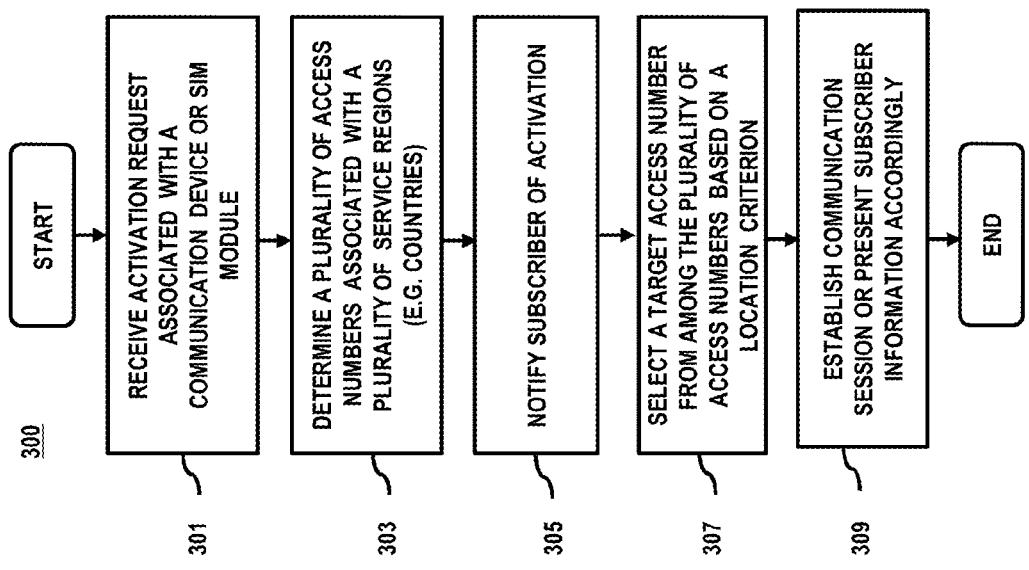

FIGS. 3A-B are flowcharts of the processes for providing global calling, according various embodiments. It is noted that the steps of processes 300 and 320 of FIGS. 3A and 3B may be performed in any suitable order as well as combined or separated in any suitable manner. Further, all or portions of the steps of the processes 300 and 320 may be initiated or completed by any of the components of the system 100, for example, by the global roaming multiline platform 114. However, for clarity in discussing the processes, the global roaming multiline platform 114 is referred to as completing various steps of said processes, which may be performed in any suitable order and where one or more of the steps may be optional.

As shown in step 301 of FIG. 3A, the GRM 114 may receive an activation request for a communications device. Typically, the device may have an identification number associated with a SIM or similar identity modules. In one embodiment, the activation request may be initiated in response to a user's enrollment in a global calling service. In this step, the subscriber may furthermore indicate a plurality of regions the user is planning to visit or would like global access numbers in. In some embodiments, the platform 114 may recommend the regions or country to select based on contextual information (e.g., roaming history, billing records, location traces, etc.) associated with the user. In one embodiment, the regions are presented as individual countries. In addition or alternatively, a region can be defined as any geographical area and encompass multiple countries or a larger scale, or subdivisions (e.g., states, counties, provinces, etc.) within a country on a smaller scale.

In step 303, a plurality of access numbers (or identification numbers, e.g., MSISDN or MDN), each associated with a region to be visited, are determined or acquired. By way of example, access numbers can be telephone numbers (e.g., MDN) when used in the context of traditional cellular or phone networks. In the context of other communication networks (e.g., email, instant messaging, etc.) the access numbers can be equated with user names, public profiles, or any other indicia of identification. For example, for a subscriber planning to visit India, a local phone number in India is determined and assigned (e.g., based on some agreements with local host networks). In one embodiment, the platform 114 may be configured with a bank of available local numbers from which to assign. In addition or alternatively, the platform 114 may request that the local host network assign or otherwise determine the local access number for the requesting device. In preferred embodiments the access number are identification numbers which allow voice, data, short messaging calls or connections.

In one embodiment, the platform 114 associates the determined access numbers for the selected regions with the SIM or a unique identification number associated with the device. The access number may be in the form of MDN or MSIDSN. By way of example, the associated can be implemented as local accounts with the respective local host networks. In this way, when an enrolled device attempts to register in a local host network, the provisioning data for enabling local access is already configured with the local host network, and not information outside of the local host network is needed to register the device for operation on the local host network.

In step 305, the subscriber is notified of the activation of the service. For example, the platform 114 or home network operator may send a message indicating the regions and associated local access numbers for which the device is configured. On activation, the user may also specify preferences for how the global calling service is to activate including, for instance, specifying which local access numbers to make visible to others, and/or the rules/criteria for presenting the numbers. For example, the user may select caller identification to present so that the user always appears local to called or calling parties. In other cases, may specify that only callers in a particular region (e.g., China) will be presented with local caller identification information, while callers from all other regions will be presented with the user's home network caller identification information. It is contemplated that the user and/or the service provider may set any default or personalized configuration for determining how to present caller identification information.

In step 307 (e.g., when the subscriber may be visiting one of the regions or may be simply trying to connect with a party in that region) a target access number associated with the region is selected from among the plurality of the access numbers to use as the user primary number. In one embodiment, the selection is made automatically based on the user's location or based on which local host network the device attempts to register from. For example, on powering up in a local host network and initiating a registration request, the act of registering in that local host network is indicative of the device's being within a physical location (e.g., a cell site) serviced by the local host. Accordingly, in one embodiment, the location need not be sensed or determined separately from the act of registration. In other embodiments, location information about device can be sensed and then registration with the appropriated local host network can be initiated based on the location information. In other words, the platform 114 determines a target access number (e.g., what local access number to use for a given communication or as the primary registered number) from among previously provided local access numbers to use for a device based on a location criterion. The target number is then associated with the mobile device, e.g., as part of the device registration process. As discussed, the location criterion may depend on the location of the communication device, a caller to the device, or a called party from the device (with respect to the plurality of communication service regions).

In step 309 a communication session or connection may be established or routed or relayed (or a message may be routed) according to the selected or determined target access number. In some embodiments, subscriber information (e.g., caller identification information) may be presented (e.g., to the calling or called party device) based on the target access number or any other of the provisioned local access numbers. In one embodiment, the selection of a target number may affect the manner or route in which a communication session is established and hence charges incurred as well as the subscriber information (associated with device) which may be presented (see the example above in relation to FIG. 2). For example, when a US-based (home network in the US) device is visiting India and the subscriber tries to call a party with local number in India a target number local to India would be selected and the call would be routed within Indian networks and the called party will be presented local (to India) caller information. Additionally if the US-based device receives a call from an Indian caller again the call will not be routed to the US first and will be handled locally. In this manner both the US-based subscriber visiting India and his or her calling parties will incur much lower costs since there is no international call roaming or routing. In another scenario the subscriber may be still in the home network but calling a party in a one of the regions. In some embodiments the location criterion may be, e.g., the location of the subscriber (and the device), the intended called party region or the region of a calling party or a combination thereof. In some embodiments an access number may be designated as the primary access number based on a location criterion (e.g., to receive and answer calls from non-local access numbers).

FIG. 3B illustrates the process 320 for providing global calling, according to one embodiment. In step 321, the global roaming multiline platform 114 may detect a request to register a communication device within one of the plurality of communication service regions. This for example can be according to standard roaming protocols and signaling schemes such as SS7 and via a roaming hub and/or an interoperability platform (e.g., when a UPDATE LOCATION message is received).

In step 323, the location of the communication device can be determined (e.g., based on the signaling parameters in the SS7 messages or other information available in the network). Based on this information, in step 325, an access number (or identifier) among the plurality of access numbers is selected and designated as a primary communication number for the communication device while at that location. In some embodiments the option may be given (e.g., to the subscriber) to select a specific target access number. Furthermore a profile associated with the subscriber may be update. According to some embodiments a profile associated with the device or subscriber may be updated to include designated target access number. This may include a roaming profile or billing/personal (e.g., according to various levels of the CAMEL standard) or other forms of subscriber data.

In step 327, the profile may then be transferred or relayed to a network entity (e.g., a location register) in one of the communication service regions (based on the determined location). These steps may be implements as part of standard SCCP messaging such as Insert Subscription Data (ISD). Consequently the visited network (or its relevant entities) will have access to the subscriber's profile and access number(s) and as a result communication sessions to or from the device can be handled appropriately.

Figure 4:
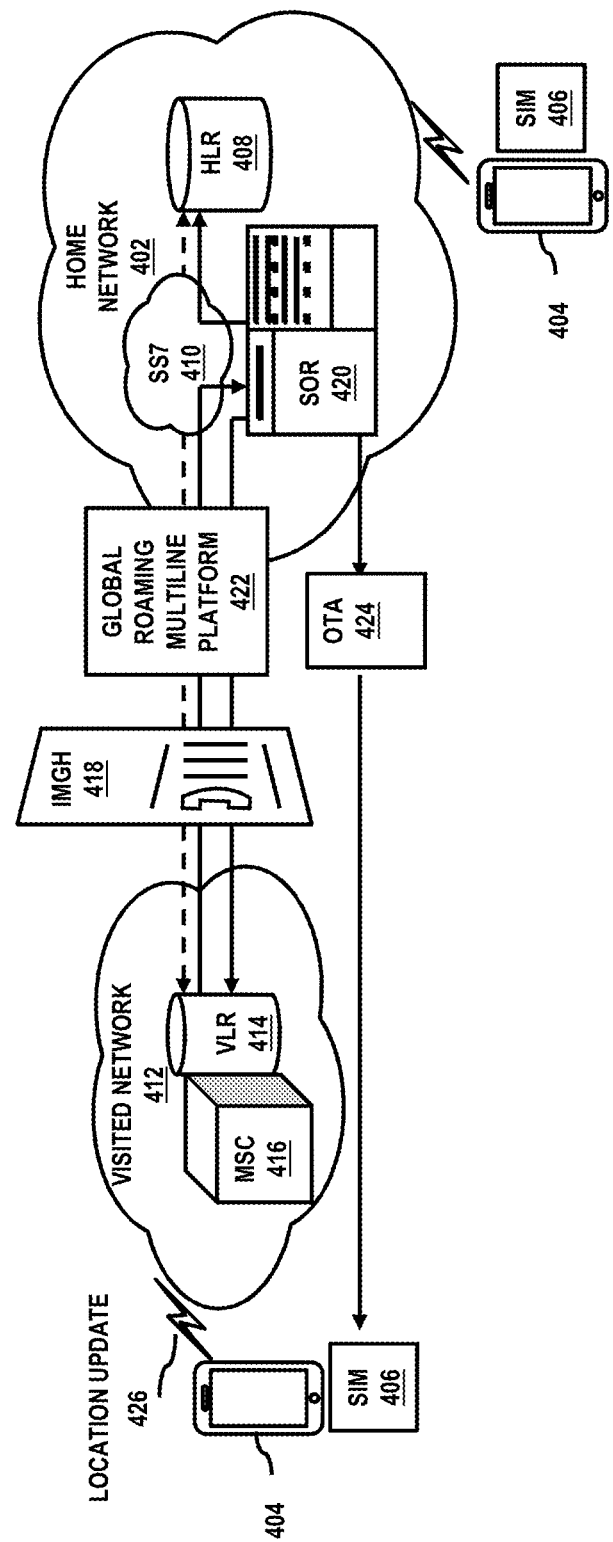
FIG. 4, is a diagram of a communication network configuration for providing global roaming multiline service, according to one embodiment.

FIG. 4, is a diagram of a communication network configuration for providing GRM (or SIMM-R), according to one embodiment. The home network 402 may be (or include) a wireless (cellular or otherwise) network with technologies such as GSM, CDMA, LTE providing access to a mobile computing/communication device 404 (a phone, PDA, tablet, wearable camera/device etc.). The mobile device 404 may also include a subscriber identification module (SIM) 406 which may include a unique identifier (usually a number) associated with the device or the subscriber (user). The network may include one or more home location registers (HLR) 408 which may obtain and register the current location of mobile devices when they are within or roaming outside the network 402. The signaling and control exchanges may take places over a network 410 configured to handle Signaling System 7 (SS7) protocol, its variants, or similar protocols. In particular, standards such as Signaling Connection Control Part (SCCP) may be employed to convey control messages and signals. The SS7 network 410 may comprise of various Service switching points (SSPs), signal transfer point (STPs), and service control point (SCPs) which can communicate with other associated entities depicted. In particular the SS7 may include a Home Operator (HO) STP (e.g., a Verizon Wireless™ VWZ STP).

Intelligent Network (IN) or Wireless Intelligent Network (WIN) principles may be employed in various parts of the network configuration 400. The operator of the network 402 and other networks in configuration 400 may control various aspects of the calls between communication entities (mobile or stationary devices or network elements, etc.) according to a variety of protocols and standards. An example of such a protocol (standard) is Customized Applications for Mobile networks Enhanced Logic, or CAMEL. or its various phases (all of which are included herein by reference to documents such as 3GPP TS 02.78, 3GPP TS 22.078, 3GPP TS 29.078 maintained by European Telecommunications Standards Institute (ETSI)).

When the mobile device 404 visits a network 412 in a different service region (in this example another country) a standard roaming service may be available. The visited network 412 typically includes one or more Mobile Switching Centers (MSC) 414 and Visitor Location Registers (VLR) 416 which may operate according to various mobile communication protocols or standards and are employed to provide services such as roaming. The visited network may be partner visited network (FPMN) or a non-partner (in the GRM service) visited network (VPMN).

The SIM 406 inside the mobile device 404 may include a unique identifier which may help the network components (e.g., MSC/VLR) to identify the device and its home network (and its associated address or number) and thereby initiate a roaming session. Such an identifier maybe an IMSI number. The visited network 412 and home network 402 may be coupled through an International Multiline Gateway and Hub (IMGH) 418. Such a gateway may provide various levels of connectivity e.g., communication channels (e.g., voice or data), dedicated signaling channels, or channel-associated signaling (CAS). In particular, IMGH 418 enables exchange of SS7 messages and it may include various SSPs, STPs, and/or SCP nodes. Additionally, the IGMH 418 may include international roaming hubs where a hub operated possibly by a third party handles roaming procedures or it may include interoperability platform where adaptation between different communication or messaging technology could happen (e.g., if the visited network 412 is a GSM network and the home network 402 is a CDMA network, then such a platform may be employed).

The Steering For Roaming (SOR) platform 420 is a platform configured (among other functionalities) to steer communication sessions (e.g., call, data, or SMS) for devices roaming in the visited network to favorable roaming partner(s). For that purpose signaling schemes and CAMEL applications may be employed. In some embodiments an Over The Air (OTA) platform 424 may be available to provide over-the-air SIM or multiple SIMs for various purposes such as roaming for voice or data e.g., General packet radio service (GPRS). SOR allows registration from a preferred network, manual mode, or QOS (quality of service) expiry. SOR platform 420 may reject UL from non-preferred network. In some embodiments the platform 420 may provide other additional functionalities such as multiline functionalities.

According to some preferred embodiments a Global Roaming Multiline (GRM) (or Global Mobility Management (GMM)) platform 422 is provided to facilitate certain global calling features disclosed earlier. In some embodiments the GRM platform 422 may be part of the SOR platform 420 (in-signal mode) and in some embodiments it may be employed in monitoring mode where it listens to exchanges signals between other entities and reacts accordingly. This results in flexible deployment options. Some embodiments may be implemented through SS7 and/or OTA integrated application logic. In some other embodiments the GRM platform 422 may include the SOR platform and some other platforms or logics such as interoperability platforms/interfaces, SS7 STP's and other signaling interfaces for global roaming.

In some embodiments (after registration of the device) the SOR platform 420 (or a network traffic redirection platform (NTR)) performs rules check and sends a list of new public land mobile networks (PLMN) in an OTA message (through OTA platform 424). The salient novel functional features of Roaming MultiLine (SIMM-R/GRM) are described next.

Profile Management: Each MSISDN number that the SIMM-R subscriber has is referred to as a profile. The original profile associated with the home MSISDN is called primary profile, while the other profiles associated with the partner (foreign) MSISDN(s) are called secondary profile(s). All supplementary services like call-barring, roaming, etc. of each profile are separately manageable, according to some embodiments. In preferred embodiments, the subscribers may perform various operations to manage their profiles. These operations are listed in the "Subscriber Initiated Operations" feature below.

Ease of Provisioning: In preferred embodiments, the SIMM-R service does not require the subscriber to go to operator stores and swap their SIM for another in order to avail of the service. Subscriber can seamlessly activate secondary MSISDN(s) i.e. profiles on their existing SIM via SMS/USSD. The option to avail of the service via operator stores or on operator website is of course also available via powerful SIMM-R XML APIs that operator CRM, provisioning and website systems can easily integrate with.

Number Management: According to preferred embodiments the SIMM-R's number-management system saves operators the hassle of managing the lifecycle of these secondary (i.e. partner) numbers. Once home operator pre-provisions a pool of available secondary numbers in the SIMM-R platform, SIMM-R automatically manages their lifecycle from Available to Allocated to De-allocated to Quarantined (a state in which a number stays after de-allocation for an operator-configured period of time before becoming available again for allocation) and back to Available.

Subscriber Initiated Operations: According to preferred embodiments the subscriber can perform several operations, some of which may include—disable MT Call/MT SMS on any profile, time-band based MT activity barring and call-forwarding control. These operations are executed by the subscriber as USSD commands. The format of the USSD commands as well as the USSD string sent in response to the commands is also operator-configurable.

According to preferred embodiments global seamless voice, SMS and data services are made available: (1) Receiving Calls & SMS: According to some embodiments the subscriber can receive calls and SMS on both the numbers at all times; (2) Making Calls & SMS: According to some embodiments a default profile is activated depending on the subscriber's location (See details below). Depending on which profile is currently active, the receiving party of the call or the SMS will see the corresponding CLI; (3) Data Access: According to some embodiments GRM platform roaming ML needs to be in path of control traffic to change profile.

Class of Subscriber: According to preferred embodiments a Class of Subscriber (CoS) determines available service level, and has a set of subscription features associated with it. In preferred embodiments the SIMM-R system allows defining various CoS for the purpose of subscriber provisioning. When a SIMM-R subscriber is provisioned in the system, a CoS can be associated with the subscriber whereby appropriate subscription features are enabled for this subscriber. In some embodiment the SIMM-R (GRM) system supports network-specific CoS, where the subscription features defined for the CoS may network/operator controlled and cannot be changed by subscriber. Configuration may be done on HPMN-VPMN-CoS basis. In some embodiments SIMM-R system also supports Subscriber-specific CoS, where the subscription features defined for the CoS may subscriber-controlled. Configuration may be done on HPMN-VPMN-CoS basis.

Balance check on Foreign Local number: In preferred embodiments the customer can check balance minutes on his or her foreign local number through SMS query and free message will be delivered with balance information. This feature is useful when minutes are bundled with foreign line in multiline monthly plan.

Called Line Indication (Which line was called): As a SIMM-R subscriber is reachable on any of his profiles, subscriber should be able to determine which of their numbers (profiles) has been called by using the Called Line Indication for the incoming call. According to preferred embodiments when a SIMM-R subscriber is called on any of his/her secondary profiles, the secondary profile id (e.g., #n where n=1, 2, 3, etc.) is pre-pended (prefixed) to the calling number. If subscriber is called on their primary profile, then calling number is not modified. Flash SMS also can convey which line is called during call setup time. In some embodiments flash SMS immediately may appear on the screen without need to check inbox for text thus enriching user experience to get information about line which was actually called.

Incoming Call/SMS Barring: According to preferred embodiments a subscriber can selectively allow or bar all MT activity (voice call and SMS) on a given secondary profile. For example, subscriber may choose to have only MO call/SMS capability on one profile while having both MO and MT call/SMS capability on another profile. In some embodiments the subscriber can make this profile change using USSD. By default, MT call/SMS are available on each profile. Time-Band Based MT Activity Barring: According to preferred embodiments the subscriber can define a time band for each secondary profile for which all MT activities will be barred. In some embodiments the subscriber/user can set "From time" and "To Time" in 24-hr HHMM format (e.g. 1700 to 0600).

Flexible Subscription Plan Management: According to preferred embodiments a Subscription Plan defines the various settings used to govern a subscription. The (home) operator can create multiple plans within the SIMM-R platform. In some embodiments each subscriber can be associated with only one Plan, but a plan can be associated with any number of subscribers. In some embodiments a plan may control attributes like the subscription and renewal periods, renewal modes (auto-expiry, auto-renewal) and charging parameters (separately for subscription and renewal)

Call Control using IN/CAMEL: According to preferred embodiments the SIMM-R system/service may have call-control on MT i.e. terminating calls on the secondary (foreign) profiles via IN/CAMEL based interface with network elements.

Unique Call Forwarding (Unconditional) Numbers: According to preferred embodiments the SIMM-R may support separate, unique call-forwarding FTNs for each profile for unconditional call-forwarding and IMSI-detach scenarios. Network-based Solution: According to preferred embodiments the SIMM-R (GRM) solution is SIM Application and OTA independent, and it also has the capability to handle IN and CAMEL signaling. In some embodiments the SIMM-R can operate in two modes: (1) Range-based: SIMM-R is allocated a range of secondary numbers and acts as HLR for all secondary profiles. No secondary number provisioning is necessary in HLR of partner operator providing these secondary numbers. (2) HLR provisioning: Operator provisions all numbers (primary and secondary) in respective HLRs, and SIMM-R acts as MSC/VLR for secondary numbers (provisioned statically or dynamically)

SS7-based Solution: According to preferred embodiments the solution may be built on open standards and does not utilize proprietary technologies nor is it dependent on SIM application. In some embodiments the platform may be a pure SS7-based solution that functions as virtual HLR, virtual VLR, virtual GMSC, virtual VMSC, virtual SMSC and virtual service node depending on interactions with various SS7 network elements.

Usage Record Generation: According to preferred embodiments the SIMM-R node is capable of generating CDRs for voice calls and Mobile Terminated SMS. The CDRs can be used for appropriate rating, providing discount/rebate, billing and settlement etc. between the HPMN, FPMN and the Multiple MSISDN subscriber. In some embodiments separate CDRs will be generated based on the usage by different MSISDNs for MT Calls (as well as MO calls IF MO activity needs to be routed through SIMM-R).

Number Portability Compliant: In a country where Mobile Number Portability is supported, in preferred embodiments, it is possible for the operator to acquire subscribers from other operators and offer them the GRM service. In some embodiments it is also possible for subscribers to port-out the existing HPMN and FPMN numbers.

Administration and Configuration Interface: According to various embodiments the GRM (SIMM-R) service may include intuitive and powerful web-based interfaces for administrative operations, and simple configuration of parameters. The GUI-based Administrative Interface can be used by the operator for provisioning Class of Service (CoS), home and partner network details, system parameters, HLR-IMSI association, reports, etc.

High Availability: According to various embodiments, the GRM platform and service may be designed to meet high-availability requirements and the system is usually deployed in a redundant configuration with two Verizon Global nodes. To make Database redundant, either Oracle RAC for data replication is used. GRM application also may also have a watchdog process, which oversees the state of each process and performs necessary actions.

SNMP Support: According to preferred embodiments the system is SNMP compliant, and may have extensive support for generating alarms for control and correction activities. In addition, in some embodiments, various components of the system can be controlled through any third party management console.

Activity Reporting: According to preferred embodiments the SIMM-R solution can support certain reports out of the box. In some embodiments the database may be a standard relational database (Oracle™) and can store a variety of data at deep granularity that can be accessed to generate special-analysis reports.

Scalable and Extensible: According to preferred embodiments the solution can be extended very simply and seamlessly to accommodate increases in requirements for call volumes, signaling loads and additional partner networks. In some embodiments the modular and distributed architecture of the system ensures that different components can scale independently of each other.

Secure Access: According to preferred embodiments the system is secured from unauthorized access through strong authentication and authorization schemes.

Wide Applicability: According to preferred embodiments the service can be offered to both postpaid and prepaid subscriber categories, thereby maximizing the investment on the operator.

More functional aspects of SIMM-R (also called Global Roaming Multiline (GRM)) solution/service/system, according to some embodiments are detailed next. Certain terms used and naming conventions are as follows: HPMN will be the subscriber's or customer's home network, which may be the owner of the SIM card and IMSI. GMSC_H means the Gateway MSC (GMSC) of the HPMN. MSC_H is the subscriber-serving MSC of the HPMN. SMSC_H is the SMSC of the HPMN. MSISDN_H is the MSISDN associated with primary profile and IMSI_H is IMSI associated with primary profile (true IMSI of SIM). By FPMN we mean a foreign or regional partner network providing their network's numbers for allocation and having a roaming agreement with HPMN. By GMSC_F we mean the GMSC of the FPMN. By MSC_F we mean Subscriber-serving MSC of FPMN. MSISDN_F is an MSISDN associated with FPMN's secondary profile. By IMSI_F we mean a (virtual) IMSI associated with FPMN's secondary profile. By VPMN we mean a non-partner foreign network having a roaming agreement with HPMN. GMSC_V means the GMSC of VPMN. Certain functionalities and terminology from standards such as CAMEL are employed in the description; however it is obvious that the main disclosed features are not depend upon such standards.

According to certain embodiments several deployment options and logistics may exist. The GRM system and service may be deployed, at least, in the following modes: (a). Outbound: i.e. deployed in HPMN; (b). Inbound, i.e. deployed in FPMN; (c). Centralized Cloud, i.e. deployed in centralized cloud-based hub (which may also double up as HPMN/FPMN); (d). Hybrid-Roaming Signaling (MAP) handled at HPMN while call control and translation of numbers is interfaced at Cloud.

According to some embodiments, regardless of the deployment mode, the main logistics for deploying GRM service are described below, these logistics are generic in nature and to be adapted based on final call flows and integration topology: (a) FPMN may reserve one or more sequential block of FPMN MSISDN_F numbers to be used by HPMN for Multiple-MSISDN subscribers; (b) Deploying operator may provide Multiline with the following GTs: 1 node-specific GT for each multi-line service node, 1 cluster GT common across all multi-line nodes.

The common "Cluster GT" may be used by FPMN to route/initiate MAP/CAP transactions for MT SMS and MT Call on F-MSISDN with Multiline nodes. (e.g., routing of SRI for call on MSISDN_F while in HPMN). STP/GMSC may route the corresponding TCAP Begin message to any Multiline Node based on round-robin or active-standby mode, and subsequent messages in this transaction will be done via node-specific GT assigned to that Multiline Node. This is to make sure that all messages in Transaction are through the same node. A message with CgPa="Special TT" (Title Translation) mentioned below (e.g. TT=5) is to be routed to Multiline node.

In some embodiments SMSC_H may be configured to accept MO-SMS from reserved MSISDN_F range. In yet some other embodiments, GMSC_F may be configured to route all messages with CdPa GT=MSISDN_F (like SRI and SRI-SM) to Multiline node. This may be done in one of 2 ways when Cdpa GT=MSISDN_F: GMSC_F may modify CdPa GT to "Cluster GT," or GMSC_F may modify the CdPa TT to a Special TT (e.g. TT=5), and send it to GMSC of Deploying Network.

In some embodiments, to support prefixing of CLI for MT Call on MSISDN_F, GMSC_F may be configured to support CAMEL/IN MT IDP triggering in the following way: GMSC_F may send SRI with "suppress T-CSI as disabled" to Multiline node, then Multiline may send "T-CSI GT as Multiline Cluster GT" in SRI-Ack, and GMSC_F to trigger MT-IDP to Multiline Node. Consequently for prefixing CLI for MT SMS, flow will remain same and no special functionality is required at GMSC_F.

In some embodiments, GMSC_F may be configured to route all E.214 (MGT) traffic of all participating HPMNs to Multiline node. This routing may be achieved, at least, in one of two ways where CdPa=HPMN E.214 (MGT): a. GMSC_F may modify CdPa GT to "Cluster GT" (retaining NP as E.214). This mechanism may cause problems in case all Multiline nodes are down as no backup route can be defined. b. GMSC_F may modify CdPa GT to a Special TT (e.g. TT=5), and send it to GMSC of Deploying Network. The above routing may also be done as GMSC_H but it is not suggested as it either complicates routing logic at GMSC_H or increases traffic inordinately to Multiline node.

In preferred embodiments, for MO SMS by subscriber in FPMN one of the following may be configured: (a) (Preferred) SMSC_H may accept and charge MO-SMS from MSISDN_F. No special routing is required; (b) MO-SMS may be routed to Multiline and Multiline may relay it to SMSC_F. SMSC_F may be configured to have the MSISDN_F range already provisioned. Subsequently, one of the 2 routing options may be used where Cdpa=SMSC_H: (i) GMSC_F may modify CdPa TT to Special TT (e.g. TT=5), and send it to GMSC of Deploying Network; (ii) GMSC_F may modify CdPa GT to "Cluster GT". This mechanism may cause issue in case all Multiline nodes are down as no backup route can be defined.

According to some embodiments, for prepaid subscribers the following additional logistics may be configured: (a) HPMN SCP may allow interaction between MultiLine (on MultiLine node-specific GTs) and HPMN prepaid systems via CAMEL; (b) HPMN SCP may define "special" tariffs in their prepaid systems for Roaming Multiline Subscribers to charge them differently than the normal Roaming subscribers. Multiline can enable this by adding a special prefix to B-party number (for MO calls/SMS). SMS prefixing may require CAP3 support in HPMN and FPMN (but not required in Deploying Operator).

In some embodiments, the GPRS support for Multiline subscriber while in FPMN may be achieved in one of the following ways: (a) Multiline will not change MSISDN in GPRS UL to MSISDN_F, i.e. all charging will occur on primary profile at regular roaming rates, and no GPRS support is present for any secondary (foreign) profile. No special handling required; (b) MultiLine will change MSISDN in GPRS UL to MSISDN_F, and GGSN_H may be configured to allow Create PDP Request with MSISDN=MSISDN_F. All validations may be based on IMSI and not MSSIDN. This allows GPRS services to be available separately on each profile—primary and secondary.

In some embodiments, the HPMN Voice Mail (VM) may be configured to allow access for forwarded call with OCN/RDN as MSISDN_F. This is required for LCF (Late Call Forwarding) scenario where call is forwarded to VM number when subscriber is in FPMN.

In preferred embodiments, provisioning may be supported via XML API over HTTP/HTTPS interface. To achieve this: (a) Deploying Operator may provide IP/Port on which this XML API interface will be exposed; (b) This IP/port may be opened up in Deploying Operator's firewall only for specific Client Nodes (source IP) which will be interacting with this interface. Client node can be inside the Deploying Network or on various HPMN networks (in case of centralized deployment).

In preferred embodiments, certain forms of network interface may be provided. For example, roaming MultiLine application may be implemented with a Signaling Gateway function having SCCP Relay capability. SCCP protocol may be processed in the host machine. The home operator's global node(s) may operate on SCCP messages. The deployment architecture may consist of a server farm of physical Signal Gateways. For non-redundancy, one Signal Gateway may be sufficient. However, for redundancy and improved reliability, two gateways may be the minimum requirement. Each Signal Gateway may be cross-connected to a GMSC/STP of HPMN using SS7 links over E1/T1 for MAP signaling. If one link goes down, other links in the link set can still process the SS7 messages. When both signal gateways go down, normal HLR will take over to still support SIMM subscribers as normal subscribers. The number of Signal Gateways, number of E1s and signaling links deployed depends on the dimensioning requirements of the operator.

In the following certain functional scenarios associated with the SIMM service are described, according to preferred embodiment. According to various embodiments the SIMM-R subscriber can register (UL) and perform all the below actions in HPMN, FPMN or VPMN. The signaling scenarios handled by SIMM-R in each case are described in detail next. It is obvious that the benefits of this systems are not limited to such scenarios.

According to preferred embodiments a registration process (e.g., the GSM UL) may be performed as follows. If the subscriber is currently in HPMN then GRM then the PRIMARY profile is active, so MSISDN_H may be used as CLI in all MO activity. No modification is needed in subscriber's VLR profile. If the subscriber is currently in the FPMN then SECONDARY profile is active, so MSISDN_F may be used as CLI in all MO activity. Subscriber's VLR profile is modified accordingly to contain MSISDN_F using ISD. If the subscriber is currently in VPMN then PRIMARY profile is active, and MSISDN_H may be used as CLI in all MO activity. No modification needed in subscriber's VLR profile.

According to other embodiments, a registration process (e.g., GPRS UL) may be performed as follows. If the subscriber is currently in HPMN, then Roaming MultiLine may relay GPRS UL to HLR without SCCP Calling Party Address transformation, and does not receive any more messages related to this transaction. Subscriber may receive GPRS service normally from HPMN i.e. PRIMARY profile is active. If the subscriber is currently in FPMN, then SECONDARY profile is active, so MSISDN_F may be used in all MO data activity. If the subscriber is currently in VPMN Roaming MultiLine may relay GPRS UL to HLR without SCCP Calling Party Address transformation, and does not receive any more messages related to this transaction. Subscriber receives GPRS service normally from HPMN, i.e. PRIMARY profile is active.

According to preferred embodiments Mobile Originated (MO) calls may be handles as follows. If the subscriber is currently in HPMN, then normal GSM (or CDMA or other protocols, if applicable) process may be followed, and MSISDN_H may be sent as CLI. If the subscriber is currently in FPMN, then by default MSISDN_F may be sent as CLI. If the subscriber is currently in VPMN, then normal GSM process may be followed (or CDMA or other protocols applicable), and MSISDN_H may be sent as CLI.

According to preferred embodiments Mobile Originated (MO) data (GPRS) calls may be handled as follows. If the subscriber is currently in HPMN, then normal GPRS data access process is followed. If the subscriber is currently in FPMN, then GTP control traffic may be routed to SIMM-R which may relay it to GGSN by modifying MSISDN and specialized APN. If the subscriber is currently in VPMN, then normal GPRS data access process may be followed.

According to preferred embodiments Mobile Terminated (MT) calls may be handled as follows. If the subscriber is currently in HPMN and the call is on MSISDN_H then Normal GSM process is followed. However, if the call is on MSISDN_F, then the call may always be routed on MSRN. However, if call is required to be routed on MSISDN_H (e.g. for charging purposes), then MultiLine may support this by sending primary MSISDN in Connect. User may optionally see prefixed CLI (unless "Additional Number" gets stripped off during message relay). If the subscriber is currently in FPMN and the call is on MSISDN_H, then the call may be routed to the out-roamer, i.e. this may be a regular roaming MO call, and normal GSM process may be followed. However, if the call is on MSISDN_F, then the call may always be optimally routed (i.e. routed within FPMN without tromboning through HPMN) as MultiLine sends MSRN in Connect. But if call is required to be routed through HPMN (e.g. for charging purposes), then MultiLine may support this by sending primary MSISDN in Connect. User will optionally see prefixed CLI (unless "Additional Number" gets stripped off during message relay). Finally, if the subscriber is currently in VPMN, and the call is on MSISDN_H, then the normal process (e.g., GSM, CDMA, etc.) may be followed. However, if the call is on MSISDN_F, then the call may always be optimally routed (i.e. routed directly to FPMN without tromboning through HPMN) as MultiLine sends MSRN in Connect. But if call is required to be routed through HPMN (e.g. for charging purposes), then MultiLine supports this by sending primary MSISDN in Connect. Subscriber may optionally see prefixed CLI (unless "Additional Number" gets stripped off during message relay).

According to preferred embodiments Mobile Originated (MO) SMS may be handled as follows. If the subscriber is currently in HPMN, then normal process (e.g., GSM, or other applicable protocol) may be followed, and MSISDN_H may be sent as CLI. If the subscriber is currently in FPMN, then for all practical purposes, it may be assumed that the subscriber uses one of the HPMN SMSCs (SMSC_H) to send MO SMSs. Since by default subscriber's VLR profile contains MSISDN_F when in FPMN, all SMSs originating from FPMN will have MSISDN_F as sender address. Therefore, SMSC_H may be configured to accept MO SMS messages from the specific MSISDN_F ranges. By default MSISDN_F may be sent as CLI. If the subscriber is currently in VPMN, then normal (e.g., GSM) process may be followed, and MSISDN_H may be sent as CLI.

According to preferred embodiments Mobile Terminated (MT) SMSs may be handled as follows. If the subscriber is currently in HPMN and a SMS is sent to MSISDN_H, then normal process (e.g., GSM, or other applicable protocol) may be followed. But if the SMS is sent to MSISDN_F, then GMSC_F may be configured to route the MAP message Send_Routing_Info for Short Message (SRI-SM) for MSISDN-F to GMM platform 803. Multiline may respond with MSC as its GT (GMMM GT). The forwarded SM now comes to the GMM platform 803 and the GMM platform 803 submits it to the correct MSC. Subscriber may optionally see prefixed CLI (unless "Additional Number" gets stripped off during message relay). If the subscriber is currently in FPMN and the SMS is sent to MSISDN_H, then normal process (e.g., GSM, or other applicable protocol) may be followed. But if the SMS is sent to MSISDN_F, then GMSC_F may be configured to route the SRI_SM for MSISDN-F to the GRM platform 422. GMM platform 803 may respond with MSC as its GT (GMMM GT). FSM now may come to Multiline and Multiline may submit it to the correct MSC. Subscriber will optionally see prefixed CLI (unless "Additional Number" gets stripped off during message relay). If the subscriber is currently in VPMN and the SMS is sent to MSISDN_H, then normal process (e.g., GSM, or other applicable protocol) may be followed. But if the SMS is sent to MSISDN_F, then GMSC_F may be configured to route SRI-SM for MSISDN-F to Roaming Multiline. Multiline may respond with MSC as Multiline GT. FSM now may come to Multiline and Multiline may submit it to the correct MSC. The subscriber may optionally see prefixed CLI (unless "Additional Number" gets stripped off during message relay). In addition to the MT SMS message itself, the system also transparently handles the Delivery Report and Message Waiting functions. Net result is that the subscriber can receive SMS message addressed to any of the MSISDN numbers—MSISDN_H or MSISDN_F.

According to preferred embodiments unconditional call forwarding or when IMSI is detached (e.g., from the VLR) may be handled as follows. The GRM subscriber may need to set just one forward-to-number (FTN) for MSISDN_H and all of the MSISDN_F that the subscriber has. The exception is FTN for call-forwarding-unconditional (CFU), i.e. a subscriber may set separate CFU FTNs for each of the subscriber's MSISDN_F. If the subscriber is currently in HPMN and the call is to MSISDN_H then normal process (e.g., GSM, or other applicable protocol) may be followed. But if the call is to MSISDN_F then the call may be routed to GMSC_F, which triggers Initial Dial Pulse (IDP) to the GRM platform 422. In the CFU case, the GRM platform 422 sends the CFU FTN for MSISDN_F in Connect. In the IMSI detached case, GRM platform 422 detects IMSI-detach when sending MAP message Send_Routing_Info (SRI) on MSISDN_H, and then may send CFU FTN for MSISDN_F in Connect. If the subscriber is currently in FPMN and the call is to MSISDN_H then the call may be forwarded to the out-roamer, i.e. this is a regular roaming MO forwarding call, and normal process (e.g., GSM, or other applicable protocol) may be followed. But if the call is for MSISDN_F then the call may be routed to GMSC_F, which triggers IDP to the GRM platform 422. In the CFU case, GMM platform 422 may send CFU FTN for MSISDN_F in Connect. In the IMSI-detached case, the GRM platform 422 may detect IMSI-detached when sending SRI on MSISDN_H, and then may send CFU FTN for MSISDN_F in Connect. If the subscriber is currently in VPMN and the call is to MSISDN_H then normal process (e.g., GSM, or other applicable protocol) may be followed. But if the call is to MSISDN_F then the call may be routed to GMSC_F, which triggers IDP to the GRM platform 422. In the CFU case, the GRM platform may send CFU FTN for MSISDN_F in Connect. In the IMSI-detached case, the GRM platform may detect IMSI-detached when sending SRI on MSISDN_H, and then may send CFU FTN for MSISDN_F in Connect.

According to preferred embodiments conditional call forwarding (when IMSI is attached) as follows. If the subscriber is currently in HPMN and the received call is to MSISDN_H then normal process (e.g., GSM, or other applicable protocol) may be followed. But if the call is to MSISDN_F then the call may be routed to GMSC_F, which triggers Initial Detection Point (IDP) to the GRM platform 422. The GRM platform 422 then may send MSRN in Connect message. Call-forwarding then may happen on FTN set for MSISDN_H directly at the serving MSC/VLR. If the subscriber is currently in FPMN and the received call is to MSISDN_H, then the call may forwarded to the out-roamer i.e. this is a regular roaming MO forwarding call, and normal GSM process is followed, and normal process (e.g., GSM, or other applicable protocol) may be followed. But if the call is MSISDN_F then the call may be routed to GMSC_F, which may trigger IDP to the GRM platform 422, and the GRM platform 422 may send MSRN in Connect. Call-forwarding then may happen on FTN set for MSISDN_H directly at serving MSC/VLR. If the subscriber is currently in VPMN and the received call is to MSISDN_H, then normal process (e.g., GSM, or other applicable protocol) may be followed. But if the received call is to MSISDN_F, then the call may be routed to GMSC_F, which triggers IDP to the GRM platform 422, and the GRM platform 422 may send MSRN in Connect. Call-forwarding then may happen on FTN set for MSISDN_H directly at serving MSC/VLR.

Figure 5:
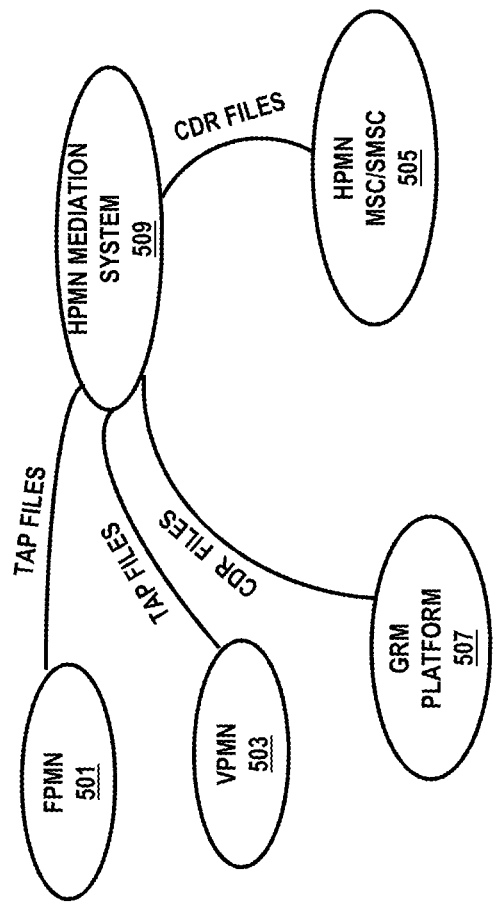
FIG. 5 is diagram illustrating file exchanges between different entities of the global roaming multiline service, according to an exemplary embodiment.

Certain billing considerations in relation to the GRM service according to preferred embodiments are as follows. FIG. 5 illustrates related file exchanges between various entities according an exemplary embodiment. The Global Roaming Multiline (i.e. SIMM-R) solution is a "single" IMSI solution. This means that the FPMN 501 always sees the primary IMSI (IMSI_H) of the roamer, whatever MSISDN is being used. The key billing considerations may be as follows for post-paid subscribers: (a) MO Calls may be charged via transfer account procedure (TAP) file generated by VPMN 503/FPMN 501; (b) MT Calls to F-MSISDN may be charged via GRM platform 507 CDR files. MT TAP records can be discarded or used for additional charging; (c) CF Calls may be charged via a combination of MO and MT call charging; (d) For SMS MO when subscriber is in FPMN 501 two options may be: (1) charging via TAP file generated by VPMN/FPMN. HPMN SMSC 505 CDRs should be discarded for F_MSISDNs when subscriber in FPMN; or (2) charging via SMSC CDRs. In this case SMSC should know the mapping between H_MSISDN and F_MSISDN; (e) SMS MT to F_MSISDN may not be charged; (f) Data (GPRS) when subscriber is in FPMN/VPMN, two options may be: (1) charging via TAP file generated by VPMN/FPMN; (2) charging via GGSN CDRs. In this case, data sessions when subscriber is registered in FPMN will include MSISDN_F. Thus, home charging system should be aware of this and be able to process it accordingly.

In some embodiments for GRM subscribers, transfer account procedure (TAP) files exchanged between FPMN 501 and HPMN 505 may be split based on the home IMSI so subscribers may be charged at preferential rates. The IMSI split may be done in the home mediation system 507 without involving the default call handling (DCH). In this case, no different Inter Operator Tariffs (IOT) may be applied for those subscribers, meaning GRM traffic would be managed in the same way than regular roaming traffic. In some embodiments if DCH is involved, a different treatment for TAP files generated by GRM subscribers may be applied, not following the same path than those TAP files corresponding to regular roamers. HPMN 505 and FPMN 501 may reach an agreement based on the number of GRM subscribers, excluding GRM traffic from regular roaming relationship. In some embodiments the TAP files exchanged between any VPMN 503 and HPMN 505 may remain the same without a change in the billing or processes.

According to various embodiments certain administrative and provisioning interfaces are as follows. The operator, for performing system administration of system parameters, GT mapping and pool management, viewing system reports, etc. can use SIMM product's GUI-based Administrative Interface. Provisioning Interface is meant to enroll a subscriber in the GRM system. The same interface may also be used for removing the subscriber or modifying the subscription details of a subscriber in the GRM system. GRM service supports provisioning using a flat file containing provisioning details in comma-separated-value format. Provisioning process may be configured to run at predefined time intervals (say 10 minutes). The GRM application treats all the provisioning data updates for a subscriber as a single transaction. If one of the operations fails, all amendments are reverted and subscriber data brought to a sanity status. Also, if any provisioning errors happen, the system creates failed records with the input data file and an error text explaining the reason for failure in comma-separated-value format.

According to some embodiments system reports may be generated. The GRM service may be configured to generate predefined reports that help mobile operator gauge the utility of the service. Key business reports that are generated from the system are as follows: (a). Service Uptake Report; (b). Call (Voice) Usage Report; (c). SMS Usage Report. In addition to these reports, several operational statistics may be recorded and available for analysis.

According to some embodiment system monitoring may be implemented. In particular, the GRM product supports SNMP based alarm generation for real time monitoring and control, under standardized Operations & Maintenance (O&M) procedures. The system extensively logs all the critical events across various components and generates subsequent alarms. The current version is compliant to SNMP version 1. Some example SNMP statistics, alarms and controls include: (1). Current number of MAP transactions and ISUP calls. Total number of these transactions per hour; (2). Critical alert trap when log file cannot be opened or created; (3). Critical alert trap when the ISUP signaling link between GRM platform and GMSC goes down; (4) Critical alert on database connection down.

Figure 6:
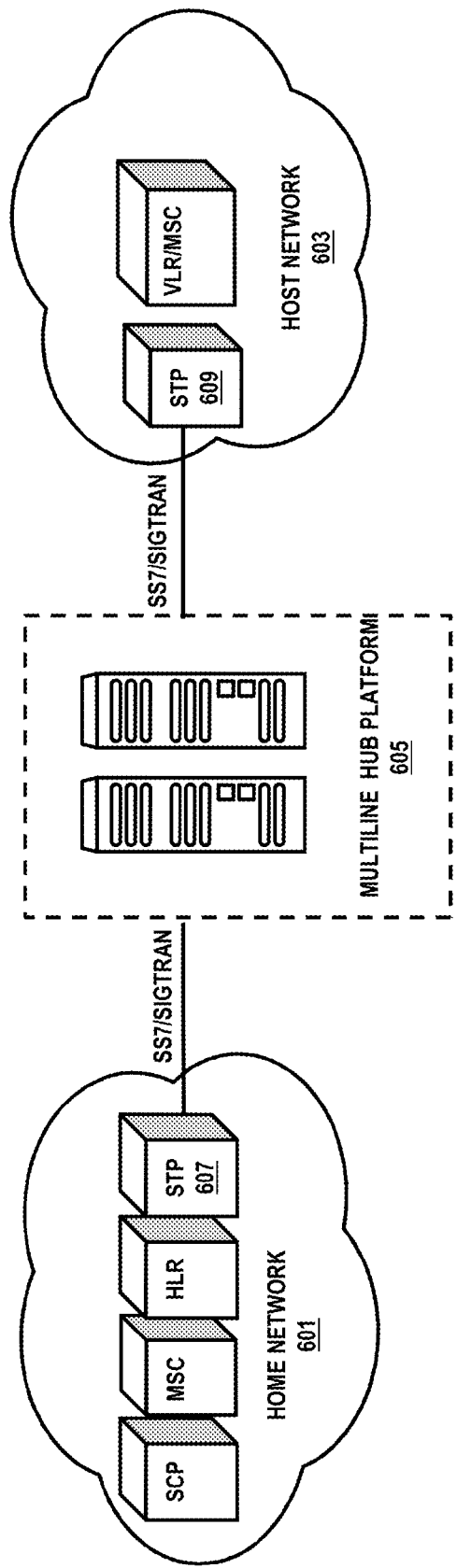
FIG. 6, is a diagram of illustrating signaling integration and interfaces for providing global roaming multiline service, according to one embodiment.

FIG. 6 illustrates signaling integration architecture between the home and host (or partner) networks, according to some embodiments. According to these embodiments signal exchanges between home network 601 and visited (or partner) network 603 may happen through a multiline hub platform 605. In some embodiments the platform 605 may be operated by a third party. In other embodiments the multiline hub 605 may be deployed on a global cloud platform and controlled by the home operator.

Further details on functions performed by the platform 605 will be given below. The platform 605 in some embodiments may support both SS7 and SIGTRAN protocols. SIGTRAN is a protocol designed to enable SS7 signals to be exchanged over IP networks and connections which are cheaper to employ. Document RFC 2719 tilted Framework Architecture for Signaling Transport describes the SIGTRAN protocol all of whose contents is included here by references.

According to one embodiment STP 607 and 609 route messages through multiline hub platform 701. STP 705 may route all messages (e.g., SS7/SIGTRAN or SMS) with reserved Global Titles (GTs) to the Multiline Hub Platform 605 (e.g., a Globetouch™ platform). STP 605 may further route all messages with local reserved number ranges. In some embodiments WIN triggers may be enabled for multiline customers and defined SCP control towards the multiline hub platform 605 for real time call control. Home network may route all the messages for multiline E.164 address to multiline client node which does MAP signaling translation before sending message to FPMN/SCCP carrier.

According to various embodiments the STP 609 in the partner or host network may route messages of virtual GTs to multiline hub platform 605. The STP 609 may also route reserved MSISDNs (E.164) traffic to the multiengine hub platform 605. The STP 609 may also optionally establish voice trunks/SIP control with the multiline hub 605 for handling voice traffic. In some embodiments CAMEL SSN may be enable for the multiline hub platform 605 so as to route CAMEL triggers to the platform 605 for real time call control. In some other embodiments the partner network (or the STP 609) may route all the signaling for multiline GTs as well as reserved number ranges to the multiline hub 605, wherein the multiline hub may be deployed on a global cloud platform.

Figure 7:
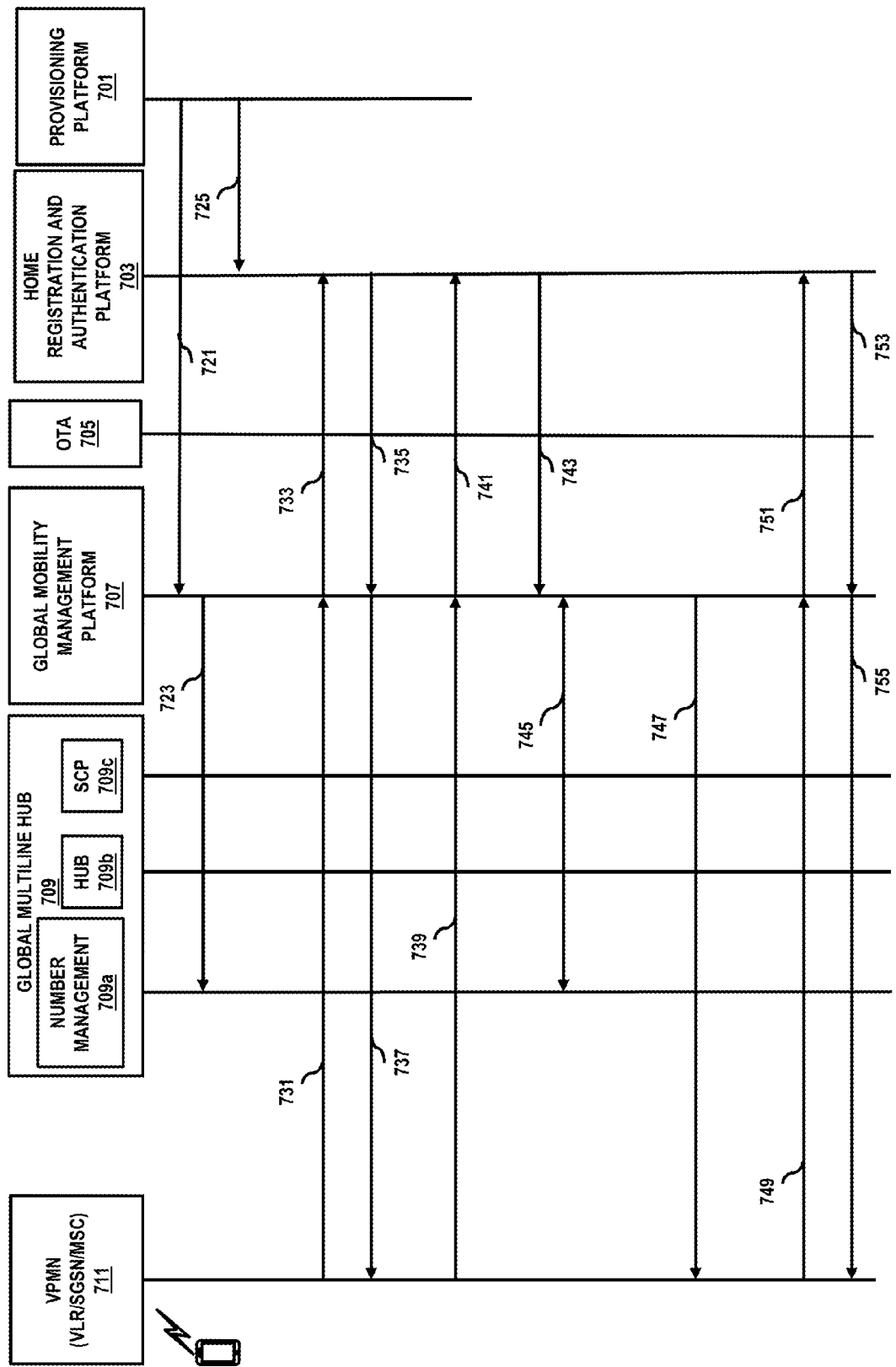
FIG. 7 is a call flow diagram indicating a registration and signaling process facilitating the global roaming multiline features in the configuration in FIG. 4, according to one embodiment.

FIG. 7 illustrates provision and registration processes and call flows in a foreign partner network according to some embodiments. The Provisioning platform 701 may include a database containing customer's profiles. The provision platform may also be a generic platform or a Mobile Telephony Activation System (MTAS) database such as Verizon Wireless™ MTAS.

In some embodiments, the Home Registration and Authentication (HRA) platform 703 may include certain location databases, e.g., home operators HLR, a global interface or interoperability platform (GSM and CDMA interoperability) and the related HLR such the one maintained by Syniverse™. The HRA platform 703 may further include home operators authentication center. It is obvious that different exemplary components mentioned can be arranged in various way and with possibly different components but similar functionalities. The Over-The-Air (OTA) platform which could be cloud-based SIM provision platform is mainly for OTA provisioning purposes e.g., while customer in foreign counter wants to setup the service. In some embodiments certain functionalities related performed by other entities (provisioning) in normal scenario may be performed by the OTA 705 in obvious way, thus in what follows the specific steps that may be performed by the OTA platform 705 will not be discussed.

Global Mobility Management platform 707 is a platform which may include home operator's global/international STP(s), the operator's SOR platform, the operator's global mobility management services (bookkeeping), and global multiline node(s). The Global Multiline Hub platform (GMH) 709 is a global platform which facilitates signaling and number translation/management between. In some embodiments it may include or facilitate certain clearinghouse/billing functionalities. In some embodiments the GMH platform may include a number management module 709*a*, a global hub 709*b* (to interface with various carriers and operators), a service control point (SCP) 709*c*. The VPMN 711 schematically shows a visited partner network (e.g., a FPMN) or related SGSN/VLR.

Upon customer's request for activation a global multiline roaming service with possibly several to-be-visited foreign countries or regions. The provisioning platform 701 may create a class of subscriber (COS) with multiline subscription and number mapping. Subsequently the Provisioning platform 701 may send a Add_Subscription message 721 to Global Mobility Management (GMM) platform 703.

The GMM platform 703 then may relay the Add_Subscription message to the Global Multiline Hub (GMH) 709 (or to its subplatform Number Management platform 709*a*). This may happen over IP or over a propitiatory SS7 network or the likes. The provisioning platform 701 may also send Add_Subscription 725 to the Home Registration and Authentication (HRA) platform 703. Upon completion of add subscription process a permanent number mapping associated with subscription of service is created and the GMR service is activated and ready.

After activation of the GMR service, the customer may visit a region associated with a partner network (e.g., USbased customer who has activated the service may visit Hong Kong wherein a local partner party or network in operation). Upon arrival the customer may turn on his or her communication device or my simply enter the region under coverage by the partner. The communication device then initiates an authentication/registration process according to standard GSM, CDMA, GPRS, etc. protocols with partner network. Subsequently, the VPMN 711 (e.g., the SSGN/VLR therein) may send a Send_Authentication_Info message 731 including the IMSI of the communication device to the GMM platform 703. The GMM platform 707 then may relay the Send_Authentication_Info message to the HRA platform 703 (message 733). The authentication center within the RA platform 703, may then respond with a Send_Authentication_Info_Response message 735 to the GMM platform 707. The message 735 may include certain authentication keys or token to facilitate the authentication process. For example, in certain embodiments standard authentication quadruplets or quintuplets may be included in the message. Subsequently the GMM platform 707 may relay the Send_Authentication_Info_Response to VPMN 711 (message 737).

Subsequently the VPMN 711 may authenticate the customer's communication device and then initiate an Update Location (UL) or registration process. Thereby the VPMN 711 may send a UL message 739 including the IMSI of the device to the GMM platform 707. Then the GMM platform 707 may relay the UL message to the HRA platform 703 (message 741). In preferred embodiments the GMM platform may set the SCCP CgPa as the SOR GT with MSC and VLR address as the GMH's GT address (e.g., the SCP address therein). In some embodiments, if a UL message is received for a multiline customer then the GMM platform 707 (or the SOR platform within it) may insert itself into relay path for Insert_Subscriber_Data (ISD) message. It may change the SCCP Calling Address to its GT. There is flexibility to choose an alternate GT for MAP VLR/MSC address. This gives flexibility to keep multiline MAP signaling node at in-network node (e.g., within the GMM platform 707) or as part of the GMH platform 709 (e.g., Globetouch™ platform).

Subsequently the HRA platform 703 may respond with an Inser_Subscriber_Data (ISD) message 743 which may include the customer's profile and the home MSISDN. Subsequently, the GMM platform 707 negotiates with the GMH platform 709 and the Number Management platform 709a to resolve the current location of the device (Publish_Location message 745 which may contain the location information about the device). Subsequently the GMM platform 707 may modify the ISD message by changing the MSISDN to the local (or foreign) F_MSISDN at the visited region (e.g., Hong Kong or another country visited). The GMM platform 707 may also insert a CAMEL Application Part (CAP) O-CSI profile for further call control. The modified ISD message 747 is then transmitted to the VPMN 711. Therefore, if the device has local MSISDN (MDN), then the MSIDSN is modified to the local in the roaming country. Subsequently the VPMN 711 responds back with the message Insert_Subscriber_DATA_RESP 749 to the GMM 707, which is relayed to the RA platform 703 (message 751). The HRA platform 703 subsequently sends an Update_Location_Acknowledge message 753 to the GMM platform 707, which is then relayed to the VPMN 711 (message 755).

In the above for simplicity, GSM and data GPRS UL's are not shown separately. The GRM solution provided applies similarly to voice (and SMS) as well as data. This can be expanded along with message flow between international SCCP carriers as part of detailed integration call flows. It is apparent that certain functionalities from the CAMEL protocol have been employed. In general limited functionality of CAMEL (or similar protocols) is needed, thus deployment will not be complicated for a partner network who may not employ such a protocol.

Figure 9A:
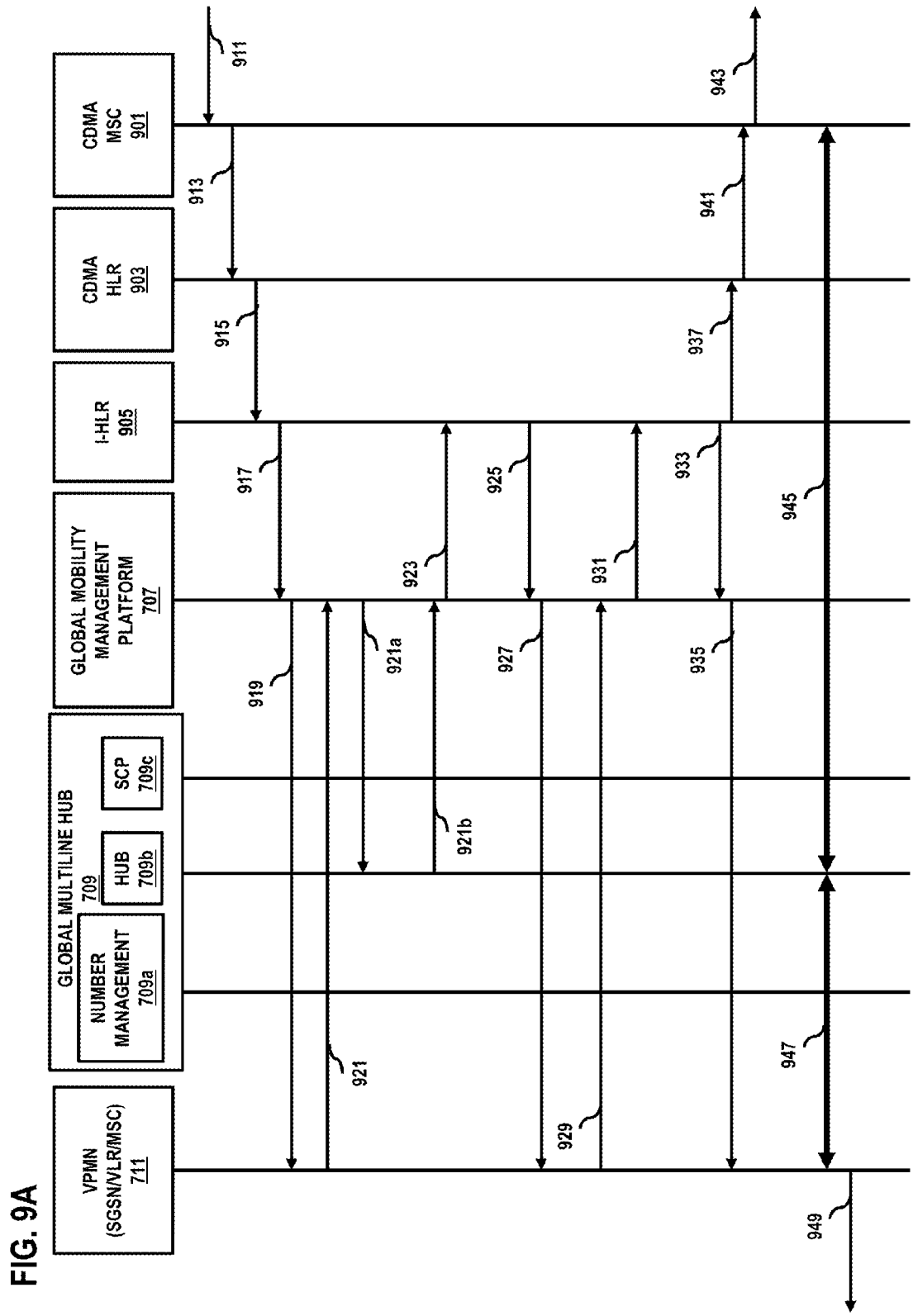
FIGS. 9A-B are call flow diagrams indicating mobile terminated call flow associated with a subscriber device roaming in a host (e.g., foreign) network calling a number in the host network and a number in the home network, respectively, according to some embodiments.
Figure 9B:
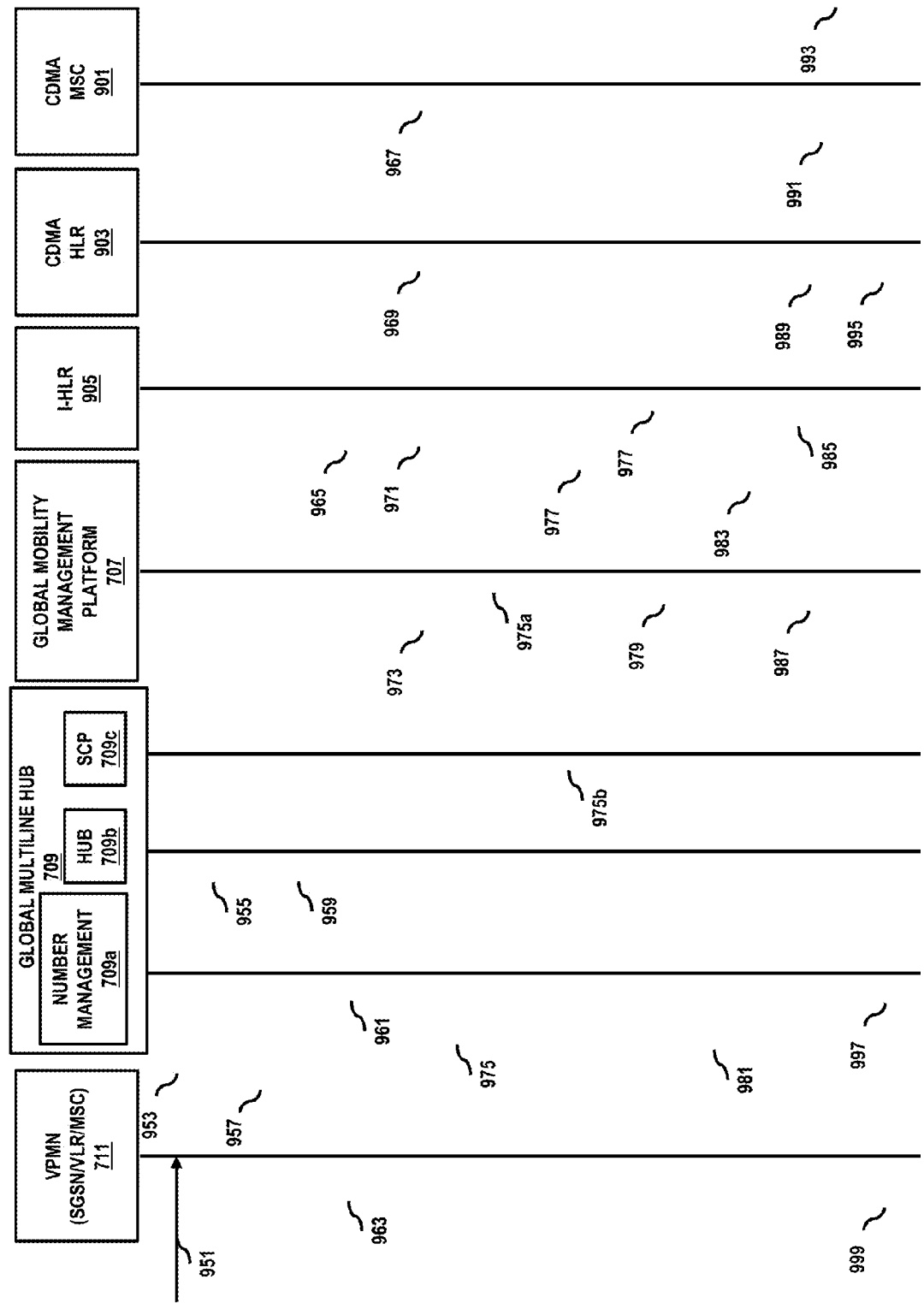

FIG. 9A illustrates call flows associated with a mobile originated MO voice call when the customer roaming in a visited region (or country, e.g., Hong Kong) calls a local number in that region (or country), according to an exemplary embodiment. In certain embodiments the local number may be even any number defined under the visited region. For example it could be a number in a third country, e.g., the US-based customer visiting Hong Kong may call number in China, in which case the local Hong Kong CLI associated with the customer may be displayed on the receiving party's device.

Figure 8A:
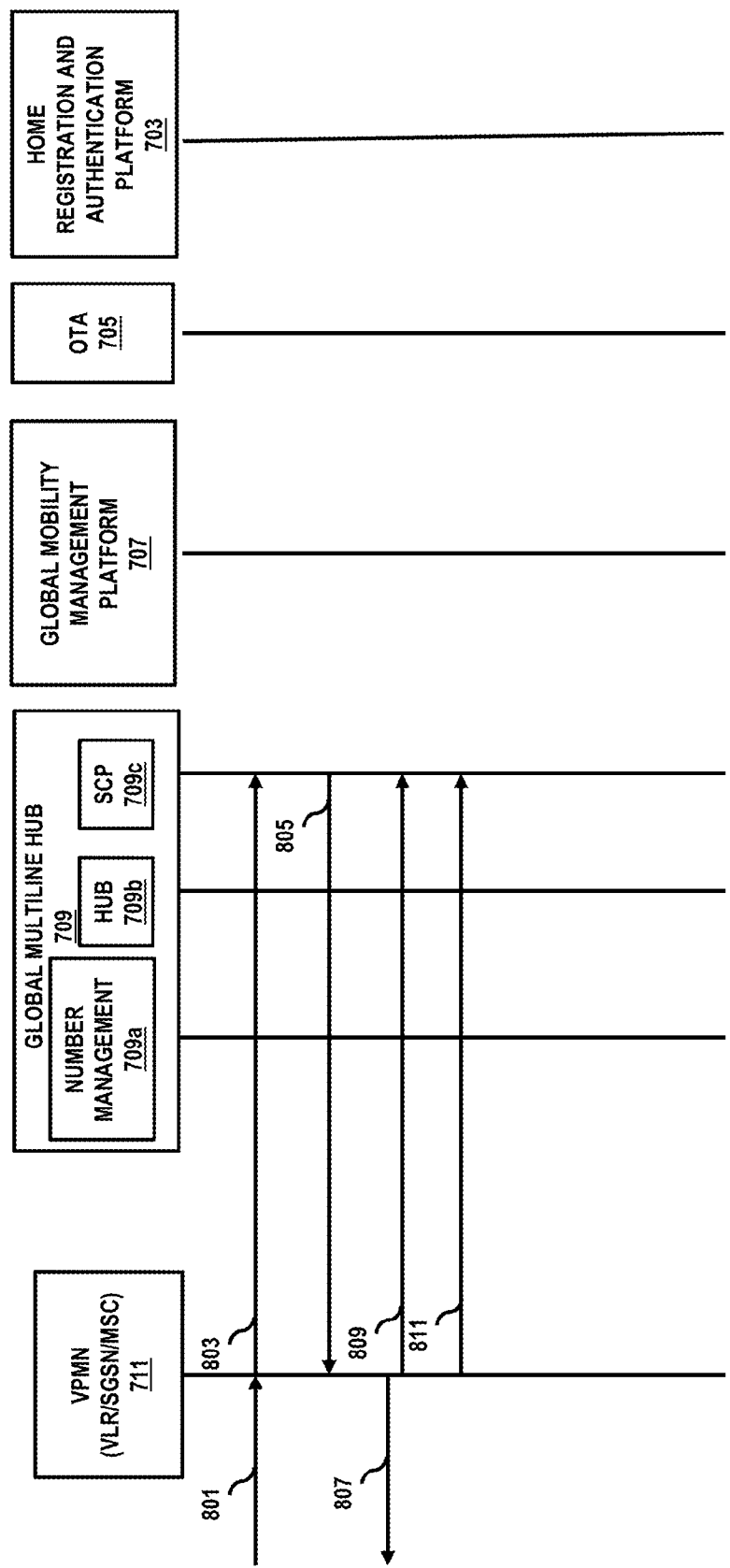
FIGS. 8A-B are call flow diagrams indicating, respectively, mobile originated call flow associated with a subscriber calling a number in a host (e.g., foreign) network and a number in the home network, according to some embodiments.

FIG. 8A illustrates a call flow diagram associated with the scenario where after registration/UL a customer roaming in a partner network (e.g., a US-based customer in a network in Honk Kong) makes a call to a party in the same network (e.g., in the HK network) or a party in a country number defined under the partner network number region (e.g., China in the case of Hong Kong). The customer may be given the option to select one or more such countries/numbers. Therefore, the customer number A#=MSISDN_F may be a Hong Kong number and the called number may be B#=NUMBER_F a Hong Kong or China number (possibly with a prefix). The MO CALL Initial Address Message (JAM) JAM (A#=MSISDN_F AND B#=NUMBER_F) (message 801) with optionally a prefix may be received from the device at the VPMN partner 711. Subsequently VPMN 711 sends the Initial DP Dial/Dialed Pulse (IDP) IDP (H_MSISDN, CgPa=A#, CdPa=B#) to the SCP platform 709c of the GMH platform 709 (message 803). Subsequently the GMH platform 709 may analyze the calling party number (CgPA), VPMN, the called number (CdPa) and may take a decision to modify the Calling Line Identification (CLI) or not. In this case, CLI is not modified. Also, depending upon integration architecture with the partner VPMN, B# may be modified by adding a prefix to facilitate billing mediation to filter out selective CDRs. Subsequently the SCP sends a CAP Request Report BSCSM (RRB)+ Continue/Connect (Notify & Continue) message to the VPMN 711 (message 805). The rest of call establishment may follow as normal (arrow 807). When the call is established the VPMN may send CAP Event Report Basic Call State Model (BCSM, ERB) ERB O-ANS (message 809). Similarly the VPMN also may send a disconnect message ERB O-Disc (message 811) when the call is disconnected. In some embodiments, call may be interfaced by multiline CAMEL SCP node and local CLI will be displayed as caller number. Additionally CDR may be generated at Multiline SCP 709c as well as FPMN/MSC. The FPMN may filter the CDR based on Multiline SCP 709c address and TAP file may be exchanged through the GMM platform 705. CAMEL parameters suppression may be required in the TAP Record if home operator billing system doesn't process CAMEL parameters received in the TAP file.

Figure 8B:
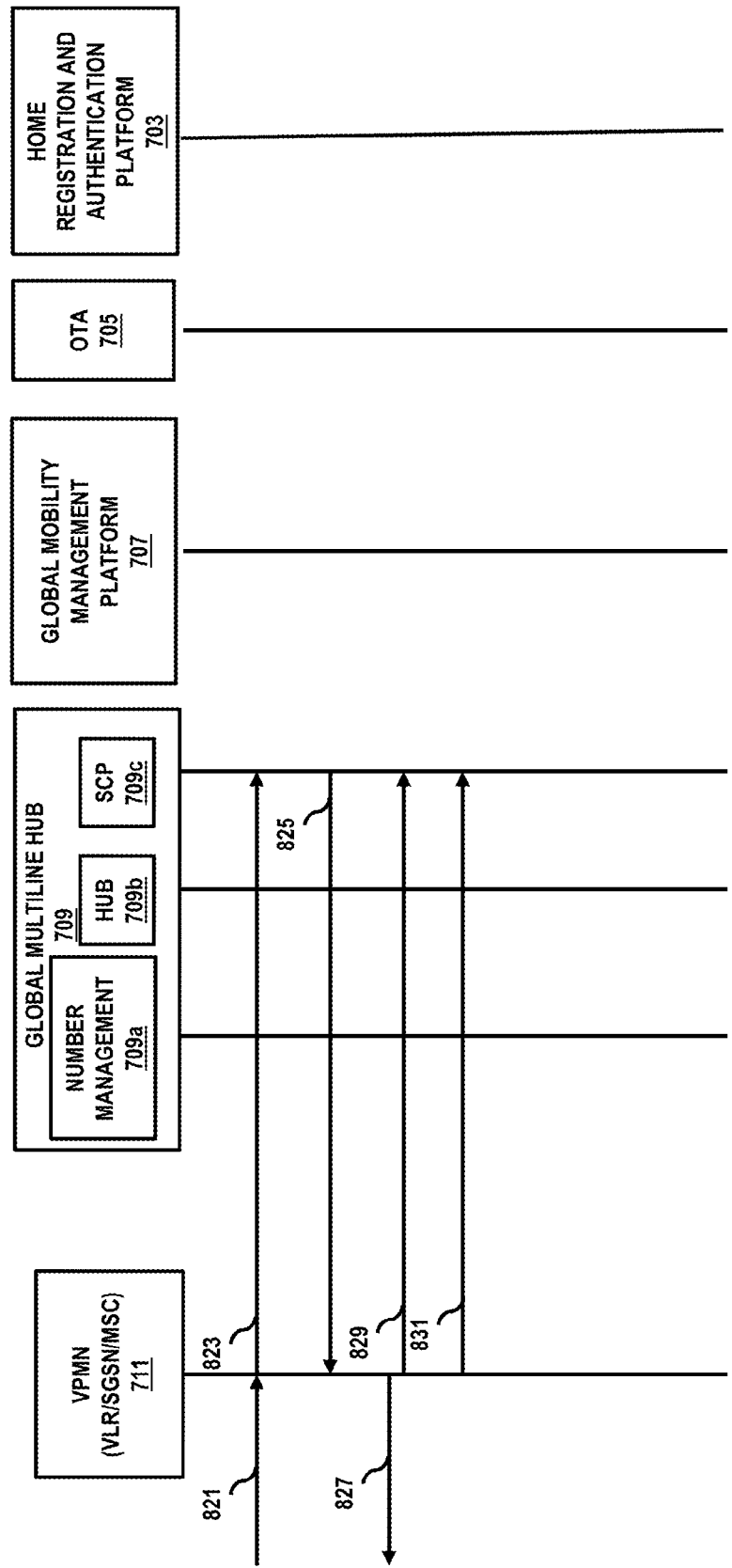

FIG. 8B illustrates a MO Call from the customer to a number in the customer's home network (e.g., the US-based customer above may call a US number or a to a 3rd country number defined under the home network's region by the customer, e.g., Canada. In this case CLI is modified to Home CLI and US number is displayed. The customer with local number (A#=MSISDN_F) may call a number B#=NUMBER_H in home network or under the region defined by the home network number (possibly with a prefix). The MO Call JAM (A#=MSISDN_F and B#=NUMBER_H) (message 821) with optionally a prefix may be received from the device at the VPMN partner 711. Subsequently VPMN 711 may send the Initial DP Dial Point (IDP) IDP(MSISDN_H,CgPa=A#, CdPa=B#) to the SCP platform 709c of the GMH platform 709 (message 803). Subsequently the GMH platform 709 similar to the previous case analyzes the calling party number (CgPa), VPMN SGSN/VLR, the called number (CdPa) and may take a decision to modify the CLI or not. In this case, however, CLI is modified using Generic_Address field in the CAP CONNECT message. Also, depending upon integration architecture with the partner VPMN, B# may be modified by adding a prefix to facilitate billing mediation to filter out selective CDRs. Call may be finally terminated on non-prefix number. The SCP 709c may send CAP message RRB+CONNECT (Generic_Address=MSISDN_F, Destination_Routing Address=NUMBER_H) to VPMN. The rest of the call flow may be exactly similar to the previous example, 827 indicates standard call flow and messages 829 and 831 indicate ERB O-ANS and ERB O-DISC messages, respectively.

FIG. 9A illustrates the call flow associated with a MT call when the customer is roaming in a partner network, receiving call on the number. The example could be the US-based customer with roaming in Hong Kong with US number B#=MSISDN_H receiving a call from a party with US or Canada number. By way of example a home CDMA network is shown with protocol ANSI 41 (or IS 41). However, it is obvious that essentially similar arrangements and protocols may be employed for other home networks such as GSM, LTE, etc. The CDMA MSC 901 and CDMA HLR 903 may be considered as part of the HRA platform 703 or separately. The I-HLR 905 may be interface or interoperability/interstandard HLR or gateway which may facilitate interconnectivity between CDMA and other protocols such as GSM or 3Gpp. The I-HLR 905 in some embodiments may be included in the GMM platform 707. In some embodiments the I-HLR 905 platform may be operated by a third party.

The (voice) MT call to MSISDN_H number from a party in the home network or region associated with it with number A# may be received at the CDMA MSC 901. The CDMA MSC 901 sends the ANSI41 message LOCATION_REQUEST (message 913) with called number (B#=MSISDN_H) to the CDMA HLR 903. Then the CDMA HLR 903 sends an ANSI41 ROUTE_REQUEST (B#=MSISDN_H) request to the I-HLR (message 915). Subsequently, the I-HLR 905 sends the MAP message PROVIDE_ROAMING_NUMBER(IMSI) on the hub serving MSC/VLR address to the GMM platform 707 with the IMSI number of the called device (message 917). Then the GMM platform 707 relays the message PROVIDE_ROAMING_NUMBER(IMSI) to the VPMN 711 (message 919). In return the VPMN 711 responds with the MAP message PROVIDE_ROAMING_NUMBER RESULT(MSRN_F) where MSRN_F is the MSRN of the roaming device in the visited/or partner network VPMN 711 to the GMM 707 (message 921). Subsequently, the GMM platform 707 may send the LOCAL_DID_REQUEST(A#, B#=MSRN, POP ID) over IP or proprietary FSM over SS7 to the hub 709b (message 921a) asking for local Direct Inward Dialing (DID) number and POP ID is the point of presence ID. Optionally, the international MSRN can be modified to a local home DID (e.g., a local US DID) to collect calls through the GMH's preferred carrier and re-routed to final MSRN_F number. Then the hub 709b may send back LOCAL_DID Response(local DID) over IP or proprietary FSM over SS7 to the GMM 707 (message 921b). Subsequently the GMM 707 may send the MAP message PROVIDE_ROAMING_NUMBER RESULT(local DID/ MSRN_F) to I-HLR 905 (message 923 which is the result of message 917). Then the I-HLR sends the MAP message INSERRT_SUBSCRIBER_DATA (IMSI, LCF FTN) on GMH's GT to the GMM platform 707 (message 925). Then the GMM sends a stand-alone (SA) MAP SA_ISD(IMSI, LCF FTN) on VPMN MSC/VLR to the VPMN 711 (message 927). Then the VPMN 711 responds back with SA-ISD_Ack (message 929). Then the GMM 707 relays the SA_ISD_Ack to the I-HLR 905 (message 931). Then the I-HLR responds back with MAP SA_ISD_END to GMM platform 707 (message 933) which will be relayed to the VPMN 711 (message 935). On the other hand, the I-HLR sends the ANSI41 message Route_Req_Result(GMH_DID) (i.e., with GMH_DID as the MSRN) to CDMA-HLR 903 (message 937). Then the CDMA-HLR 903 relays the ANSI41 message LOCATION_REQUEST_RESAULT (GMH_DID) to the CDMA MSC 901 (message 939). Thus the MT call is terminated on the GMH MSRN (message 943) and the voice call (945) on GMH 709 MSRN collected by GMH through POP (Point Of Presence). Also at the same time the voice call (947) is terminated on the MSRN_F after translation by the GMH 709. Then roamer is paged and call is terminated (949). It is evident that the GMM platform or a multiline node may relay the message(s) from I-HLR (or its component within e.g., Syniverse™ HLR) to GPMN VLR and vice-versa. The MT call may be routed to original MSRN or in some embodiments via a global hub 709b (e.g., Verizon™ Global Hub) through its preferred carrier.

Figure 10:
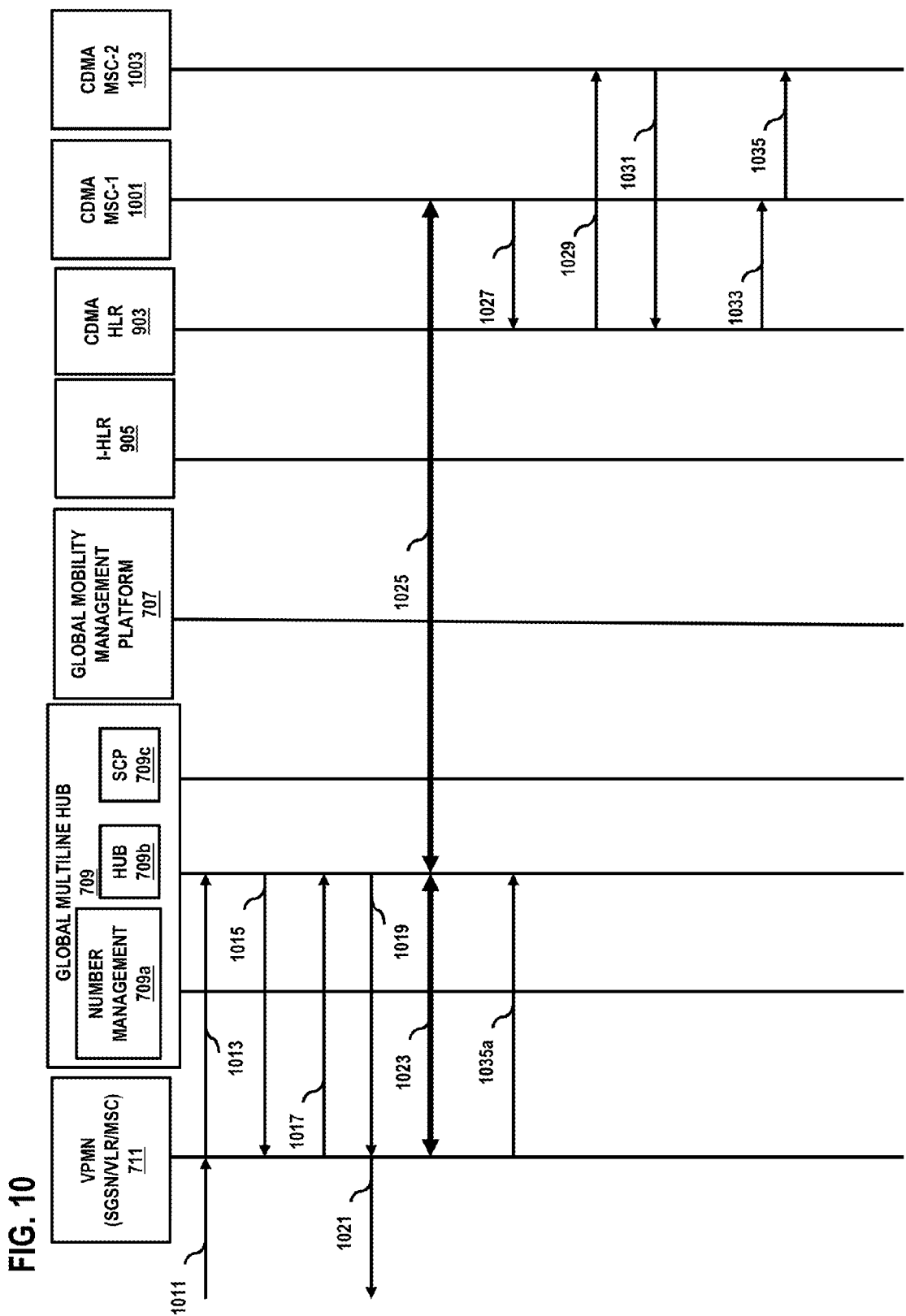
FIG. 10 is a call flow diagram indicating mobile terminated call flow associated with a subscribed device with an assigned number in a host (a foreign or international) network receiving a call on that number while in the home network, according to one embodiment.

FIG. 10 B illustrates a MT call flow diagram associated with a customer roaming in a partner network with assigned B#=MSISDN_F and receiving call from a party with a number A# in the partner network or a region defined under the partner HK, according to some embodiments. For example a US based customer in roaming in Hong Kong may receive a call from party with Hong Kong number or China number (call 951). The VPMN 711 may send the MAP message SEND_ROUTING_INFO (MSISDN_F) to the hub 709b (message 953). In return the hub 709b may respond with MAP message SEND_ROUTING_INFO_RESULT(T-CSI, LOC INFO, O-CSI) giving information about the called device (message 955). Then the VPMN may send the CAP message IDP_12(IMSI, A#, B#) to the hub 709 (message 957). In return the hub 709b may respond back with the CAP message RRB+CONNECT (DRA=GMH_DID), message 959. Subsequently call may be terminated on the GMH_DID through the GMH (or the hub 709b)'s preferred voice carrier (call 961). Thus the MT call is router on GT DID (call 963). The voice call is routed on home MSISDN/MDN (call 965). Subsequently the CDMS MSC 901 may send the ANSI41 message LOCATION_REQUEST (B#=MSISDN_H) to the CDMA HLR 903 (message 967), which in turn relays the message ANSI41 ROUTE_REQUEST (B#=MSISDN_H) to the I-HLR 905 (message 969). The I-HLR 905 then may send the GMM platform 707 the MAP message PROVIDE_ROAMING_NUMBER(IMSI, GMSC_ADDRESS) on hub serving MSC/VLR address (message 971). Then the GMM platform may send the MAP message PROVIDE_ROAMING_NUMBER (IMSI, GMSC_ADDRESS) to the VPMN 711 (message 973). The VPMN 11 then responds with the MAP message PROVIDE_ROAMING_NUMBER_RESULT(MSRN_F) conveying the associated local MSRN_F (message 973). According to some embodiment the FPMN GMSC is configured to route SRI request to Multiline Hub 709b, which returns home MDN as MSRN or local DID. Thus the call is routed directly to home MDN or via the GMH platform through its preferred carrier and afterwards it follows the same call path as if call is made to the home number (MDN).

Subsequently, the GMM platform 707 may send the LOCAL_DID_REQUEST(A#, B#=MSRN, POP ID) over IP or proprietary FSM over SS7 to the hub 709b (message 975a) asking for local Direct Inward Dialing (DID) number and POP ID is the point of presence ID. Optionally, the international MSRN can be modified to a local home DID (e.g., a local US DID) to collect calls through the GMH's preferred carrier and re-routed to final MSRN_F number. Then the hub 709b may send back LOCAL_DID_Response (local DID) over IP or proprietary FSM over SS7 to the GMM 707 (message 975b). Subsequently the GMM 707 may send the MAP message PROVIDE_ROAMING_ NUMBER RESULT(local DID/MSRN_F) to I-HLR 905 (message 975). Then the I-HLR sends the MAP message INSERRT_SUBSRIBER_DATA (IMSI, LCF FTN) on GMH's GT to the GMM platform 707 (message 977). Then the GMM sends a stand-alone (SA) MAP SA_ISD(IMSI, LCF FTN) on VPMN MSC/VLR to the VPMN 711 (message 979). Then the VPMN 711 responds back with SA-ISD_Ack (message 981). Then the GMM 707 relays the SA_ISD_Ack to the I-HLR 905 (message 983). Then the I-HLR responds back with MAP SA_ISD_END to GMM platform 707 (message 985) which will be relayed to the VPMN 711 (message 987). On the other hand, the I-HLR sends the ANSI41 message Route_Req_Result (GMH_DID) (i.e., with GMH_DID as the MSRN) to CDMA-HLR 903 (message 989). Then the CDMA-HLR 903 relays the ANSI41 message LOCATION_REQUEST_RESAULT (GMH_DID) to the CDMA MSC 901 (message 991). Thus the MT call is terminated on the GMH MSRN (message 993) and the voice call (995) on GMH 709 MSRN collected by GMH through POP (Point Of Presence). In one embodiment the voice call may be placed on GlobeTouch™ MSRN collected by GlobeTouch™ through PoP (point of presence). Also at the same time the voice call (997) is terminated on the MSRN_F after translation by the GMH 709 or the multiline hub 709b. Then roamer is paged and call is terminated (999).

FIG. 10 illustrates a MT call when the customer is at home network and receiving call on the number B#=MSISDN_F local to a partner network from a number A# in the partner network, according to some embodiments. An important example is when family and business partners of the customer (e.g., a US customer) in a third country (e.g., Hong Kong) would like to call the customer but desire to avoid expensive international calls. Most of the components in this figure are as in FIG. 9A except for the CDMA MSC 901 in FIG. 9A is replaced with two CDMA MSC's 1001 and 1003 (e.g., to indicate a practical roaming scenario within the home network).

The MT call is made from #A to the customer on the local MSISDN_F (call 1011). Then the VPMN sends the MAP message SEND_ROUTING_INFO (MSISDN_F) to the (multiline) hub 709b (message 1013). The hub in return responds with the MAP message SEND_ROUTING_INFO_RESULT(T-CSI, LOC INFO, O-CSI) giving information about the called device (message 1015). Then the VPMN sends the CAP message IDP_12(IMSI, A#, B#) back (message 1017). Subsequently the hub 709b responds with the CAP message RRB+CONNECT (DRA=Hub_DID) (message 1019) and the MT call will be routed on GT DID (message 1021). Then the voice call is terminated on Hub_DID the hub's preferred voice carrier (message 1023). The other side of the voice call is routed on home (e.g., USA) MSISDN/MDN (message 1025). Subsequently CDMA MSC 1001 sends the ANSI41 LOC_REQ (B#=MSIDSN_H) to the CDMA HLR 903 (message 1027). Then the CDMA HLR 903 sends the ANSI41 ROUTE REQ (B#=MSISDN_H) to the other CDMS MSC 1003 (message 1029). In this case the CDMA MSC 1003 is serving the called device and send the ANSI41 message ROUTE_REQ_RESULT (TLDN:MSRN) to the CDMA HLR (message 1031). The CDMA HLR 903 send the ANSI41 message LOCREQ_RESULT (TLDN:MSRN) to the CDMA MSC 1001 (message 1033) and also terminated the call on the MSC 1003 serving the customer (message 1035). On the other side the VPMN sends the CAP message ERB (T-ANS, T-DISC) to hub upon disconnection of the call (message 1035a). In preferred embodiments the call is routed through the hub 709b's or the GMH's platform core network the home operator's network (e.g., through GlobeTouch™'s core network to Verizon™'s network in the USA). In preferred embodiments FPMN GMSC is configured to route SRI request to GMH 709 or hub 709b, which returns home MDN as MSRN or global nodes or gateways/hubs of the home network local DID (e.g., Verizon™ Global local DID). The MT call is routed directly to Home MDN or via home network's global hub through its preferred carrier and afterwards it follows the same call path as if call is made to the home number (MDN).

Figure 11:
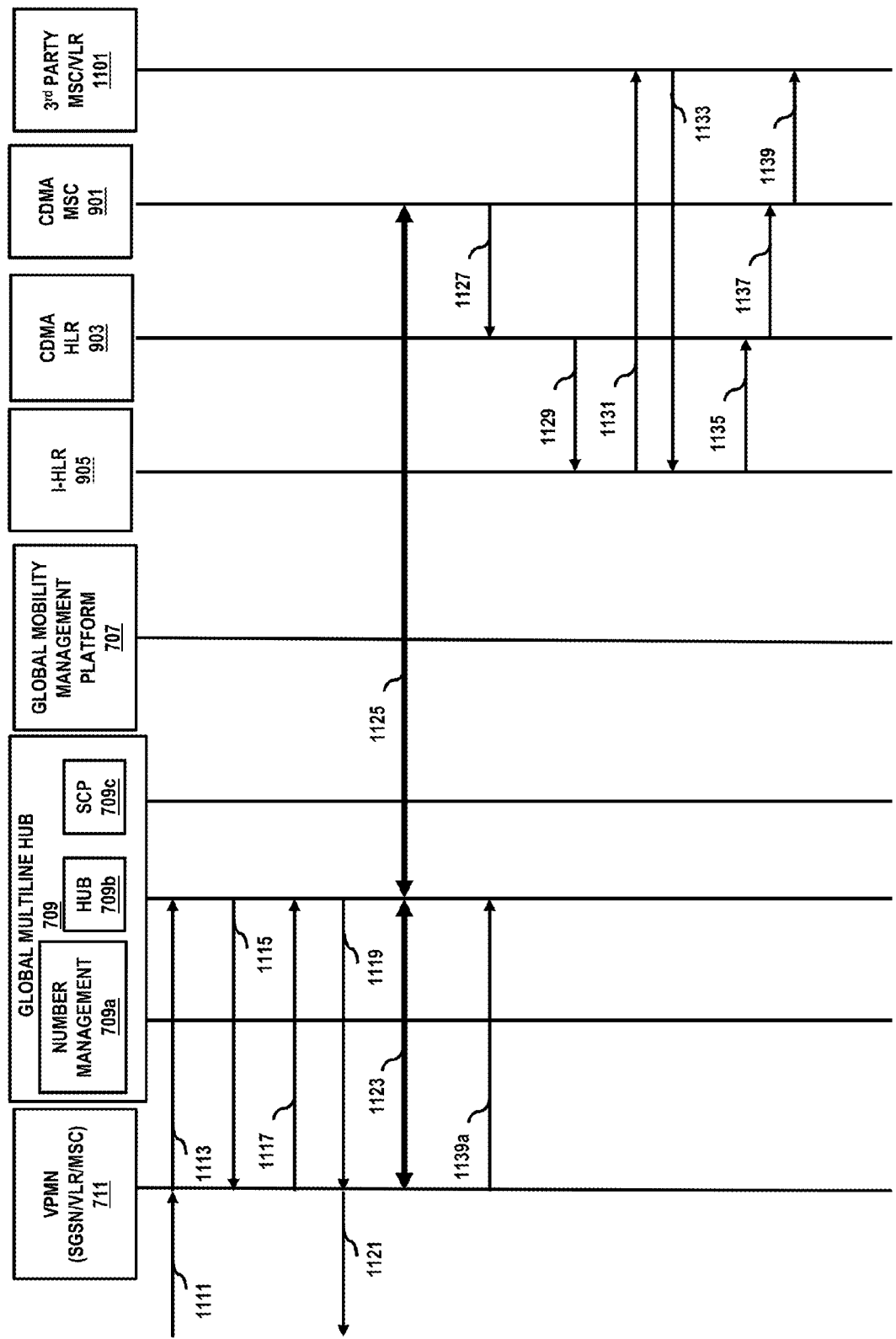
FIG. 11 is a call flow diagram indicating mobile terminated call flow associated with a customer with an assigned number in a host (a foreign or international) network receiving a call on that number while roaming in a $3^{rd}$ party network, according to one embodiment.

FIG. 11 illustrates call flow associated with MT call to the customer of the GRM service when the roaming in 3rd country and receiving call on the number B#=MSISDN_F in a partner network from a party with number A# in the partner network. An example could be the US based customer roaming in France (a VPMN other than FPMN) and receiving a call on the customer's Hong Kong number. In this case the call is routed through is routed through the hub 709b to the home operator's network and from there is routed again to France.

The MT call is made from #A to the customer on the local MSISDN_F (call 1111). The VPMN 707 sends the MAP SEND_ROUTING_INFO (MSISDN_F) to the hub 709b (message 1113). Then the hub 709b sends the MAP message SEND_ROUTING_INFO_RESULT(T-CSI, LOC INFO, O-CSI) back to the VPMN 711 (message 1115). Then the VPMN responds back with the CAP message IDP_12(IMSI, A#, B#) (message 1117). The hub sends the CAP message RRB+CONNECT (DRA=hub_DID) to the VPMN (message 1119). Subsequently the MT call is routed on GT DID (1121). The voice call is terminated on hub DID hub's voice carrier (1123).

On the other hand the voice call is routed on home MSISDN/MDN (1125). The CDMA MSC 901 sends the ANSI41 message LOC_REQ(B#=MSISDN_H) to the CDMA HLS 903 (message 1129). The CDMA HLR in turn relays the message to the I-HLR for interoperability translation. Then the I-HLR sends the MAP message PROVIDE_ROAMING_NUMBER (IMSI, GMSC) to the 3$^{rd}$ party MSC/VLR 1101 (message 1131). The 3$^{rd}$ party MSC/VLR responds back with the MAP message PROVIDE_ROAMING_NUMBER_RESULT (MSRN) returning the MSRN of the device (message 1133). Subsequently the I-HLR sends the ANSI41 message ROUTE_REQ_RESULT (TLDN:MSRN) to the CDMA HLR 903 (message 1135). Then the CDMA HLR send the ANSI41 message LOC_REQ_RESULT (TLDN: MSRN) to the CDMA MSC 901 (message 1137). The MT call is terminated on MSC serving the customer (message 1139) and when the call disconnected the VPMN 711 sends the CAP message ERB (T-ANS, T-DISC) (message 1139a). It is obvious that similar considerations as those in the previous scenarios may apply.

Figure 12:
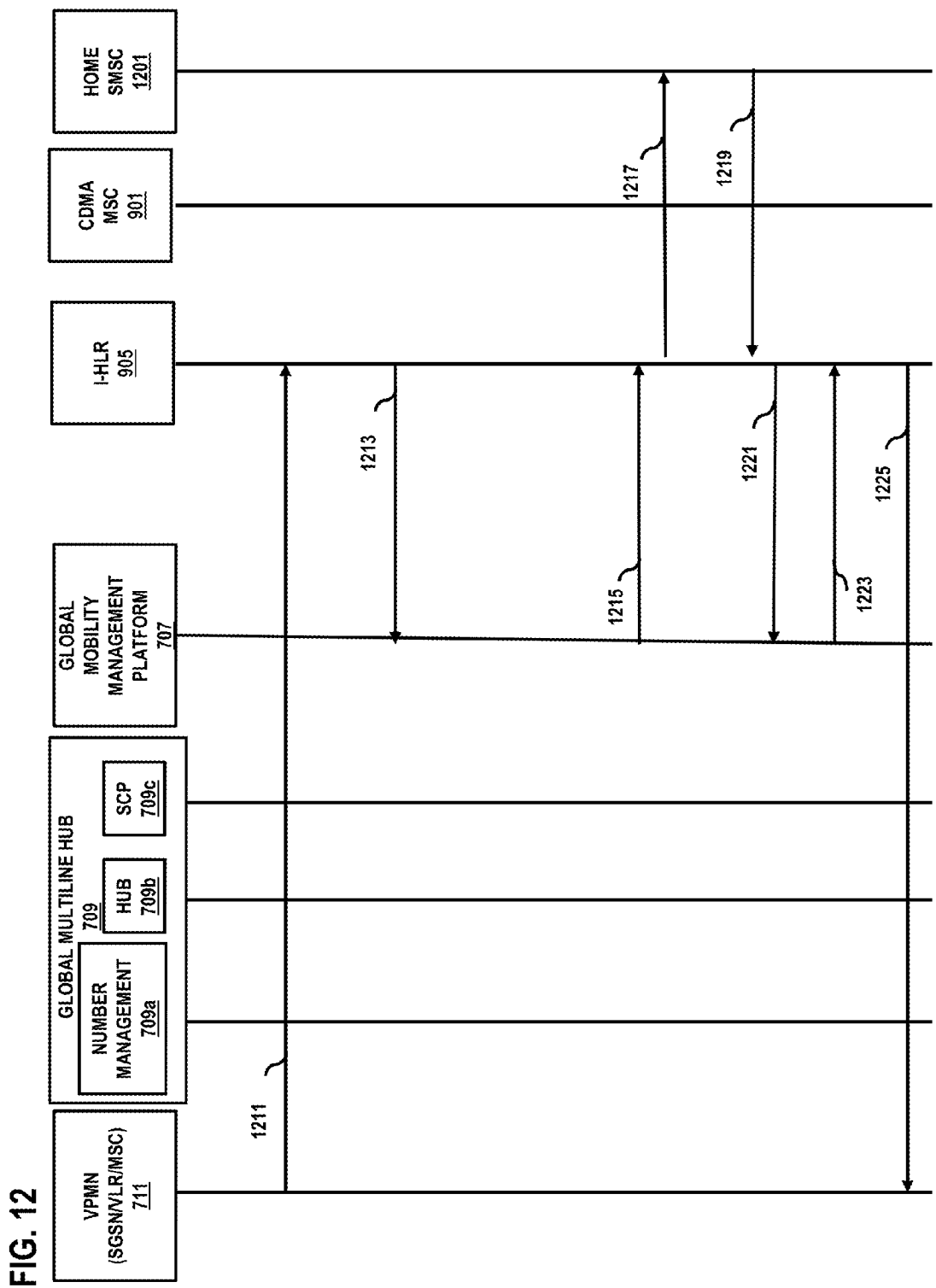
FIG. 12 is a call flow diagram indicating call flow associated with a mobile originated short message while the subscribed device is roaming in a host (e.g., foreign network), according to one embodiment.

FIG. 12 illustrates call flow associated with MO SM sent by the customer roaming in the partner network VPMN to a party with number in the home network. HOME SMSC 1201 is the home operator's SMS server. In this scenario the SM will be submitted to the Home SMSC 1201 after originating address (i.e., CLI) modification to home number.

Upon receiving the SM the VPMN sends (forwards) a MAP message MO FWD SM to the I-HLR 905 (message 1211). The parameters of the message may be: SCCP CdPA:SMSC-GT (E.164), SCCP CgPA: MSC-V (E.164), MAP_LEVEL_PARAMETERS: IMSI: IMSI, SM-RP-DA: SMSC, SM-RP-OA: MSISDN_F, SM-RP-UI: RECEIVER'S MSISDN & MESSAGE TEXT. If the message it is received for originating address belonging to multiline COS then the I-HLR 905 routes the MO FWD SM 1211 to the multiline node within GMM platform 707 (message 1213). The parameters of the MO FWD SM message 1213 may be: SCCP CdPa: SMSC-GT (E.164), SCCP CgPA: I-HLR (E.164), MAP_LEVEL_PARAMETERS: IMSI: IMSI, SM-RP-DA:SMSC, SM-RP-OA: MSISDN_F, SM-RP-UI: RECEIVER'S MSISDN & MESSAGE TEXT. Then multiline node modifies SM-RP-OA to MSISDN_H (the subscriber's number at home network) since home SMSC may not authorize SM from the local number at the partner network (i.e., MSISDN_F) and relays MAP_MO_FWD_SM message 1213 to I-HLR (message 1215). The parameters of the message 1215 may be: SCCP CdPA: I-HLR (E.164), SCCP CgPA: multiline (E.164), MAP_LEVEL_PARAMETERS: IMSI: IMSI, SM-RP-DA: SMSC, SM-RP-OA: SENDER' MSISDN_H, SM-RP-UI: RECEIVER'S MSISDN & MESSAGE_TEXT. Subsequently the I-HLR sends the point to point short message MAP Short_Msg_MO_PtoP (message 1217) to the (CDMA) Home SMSC 1201. The CDMA SMSC 1201 delivers the message to the recipient and in turn sends the acknowledge message Short_Msg_MO_PtoP_Ack to I-HLR (message 1219). The I-HLR then sends the MAP MO_FWD_MO_SM_Ack with CgPA:I-HLR and CdPA: multiline, to the multiline node within the GMM platform 707 (message 1221) which relays back the message to the I-HLR (message 1223). The parameters of the message 1223 are CgPA:multiline, CdPa:I-HLR. The I-HLR then finally relays the acknowledgement message to the VPMN 711 (message 1225) with parameters: CdPa:I-HLR SMSC GT, CdPa:V-MSC.

Figure 13:
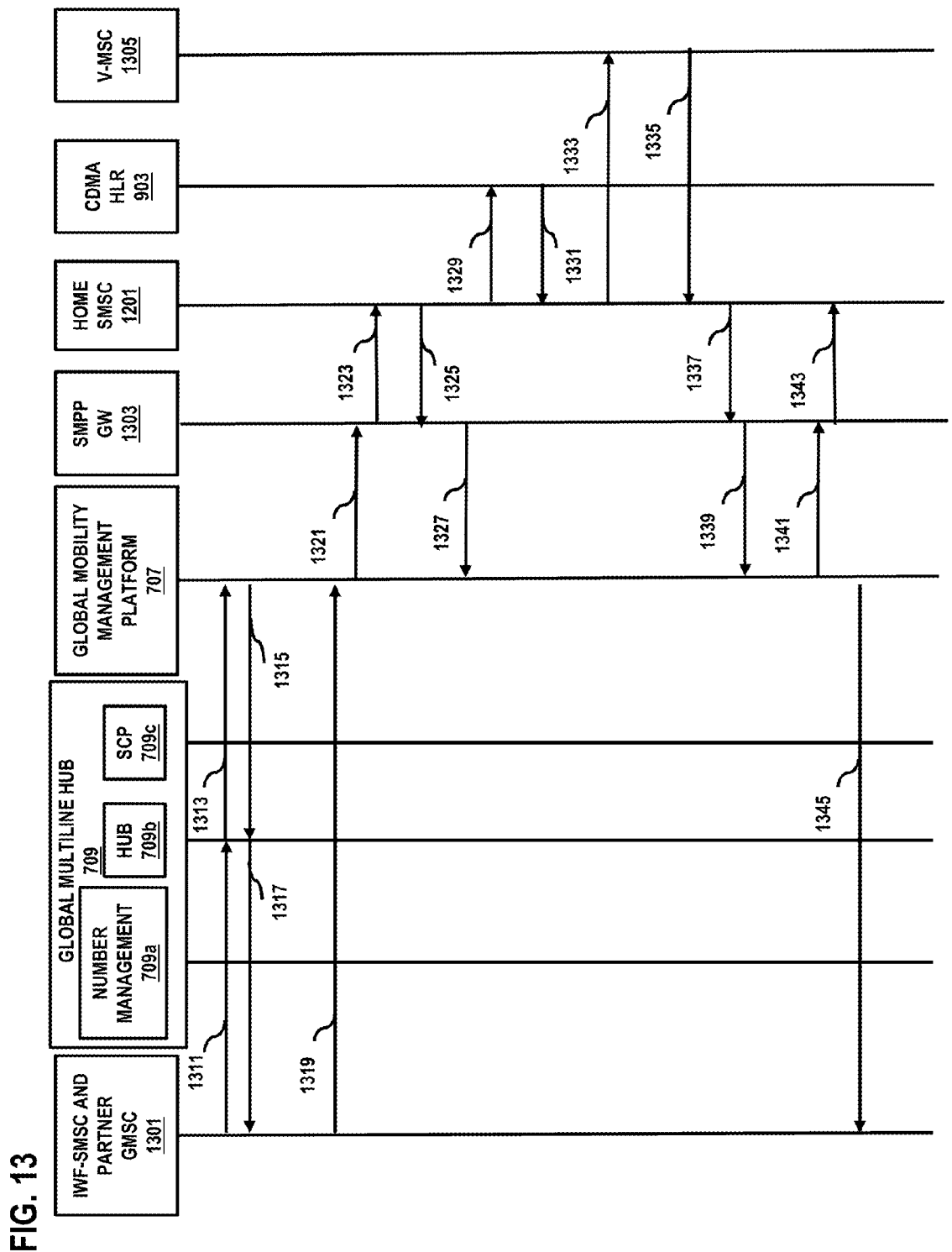
FIG. 13 is a call flow diagram indicating call flow associated with a mobile terminated short message sent to the local assigned number, according to one embodiment.

FIG. 13 illustrates the call flow associated with the MT SM send to the number local to a partner network (MSISDN_F). The InterWorking Function (IWF)-SMSC and partner GMSC 1301 indicates the point where the SM may be received initially. The SMPP GW 1303 is a short message peer to peer gateway (SMPP) and V-MSC 1305 is MSC of the partner network. The example could be a US-based customer having a Hong Kong number through the GRM service and receiving SMS on that number.

According to some embodiments the FPMN GMSC in 1031 may be setup to route all the request for reserved MSISDN range to home operator's global nodes, SRI-SM request from any IWF-SMSC will be routed to the multiline node 709*b* which will return IMSI and its own address as Service MSC address. MT-FWD-SM from I-SMSC 1301 is routed to multiline node 709*b* which will submit the message to SMPP Gateway 1305 on home MDN/MSISDN since Home SMSC 1201 will not honor foreign MDN/MSISDN to terminate SMS. According to some embodiment the Home SMSC 1201 will apply standard call flow to terminate the SMS to the end customer. For example, if the customer is at home then SMSReq to CDMA HLR 903 will return serving MSC location to which SMS will be terminated else if customer is roaming then SRI-SM DIP would be required towards I-HLR 905.

The IWF-SMSC platform 1301 sends SRI_SM (MSISDN_F) to the multiline hub 709*b* (message 1311). The hub then relays the message SRI_SM(MSISDN_F) to the GMM 707 (message 1313). The GMM 707 responds with SRI_S-M_ACK(IMSI,MSC=Multiline Node) to the hub 709*b* (message 1315). The hub then relays the message to IWF-SMSC and partner GMSC platform 1301 (message 1317), which in turn sends MT_FWD_SM message to the GMM platform 707 with parameters: IMSI, CdPa=multiline, SM-RP-OA=Sender's MSISDN, SM-RP-UI: RECEIVER'S MSISDN=MSISDN_F& message text. (message 1319)

The GMM platform 707 then sends the SMPP_Short_SM (Receiver MSISDN=MSISDN_H) to the SMPP GW 1303 (message 1321). Then the gateway 1303 relays the message to the Home SMSC 1201 (message 1323) which it also relays it back to the SMPP GW 1303 (message 1325), which in turn relays it to the GMM platform 707 (message 1327). The Home SMCS 1201 also sends a message SMSREQ (Receiver MDN=Home CLI) to the CDMA HLR 903 (message 1329), which in turn returns back with an SMSRED_ACK message (message 1331). Subsequently the Home SMSC 1201 submits the SM as point to point SMS_PtoP to V-MSC 1305 (message 1333) which in return sends the SMS_PtoP_ACK (message 1335) and routes the SM normally. Then the Home SMCS 1201 sends a SMPP_Deliver_SM_Msg ID to the SMPP GW 1303 (message 1337) which relays it the GMM platform 707 (message 1339). The GMM platform 707 responds with SMPP_Deliver_SM_Resp (message 1341), which is relayed to the Home SMSC 1201 (message 1343). Finally the GMM platform 707 also sends the acknowledgement message MT_FWD_SM_ACK to the IWF-SMSC and partner GMSC platform 1303 (message 1345).

Figure 14:
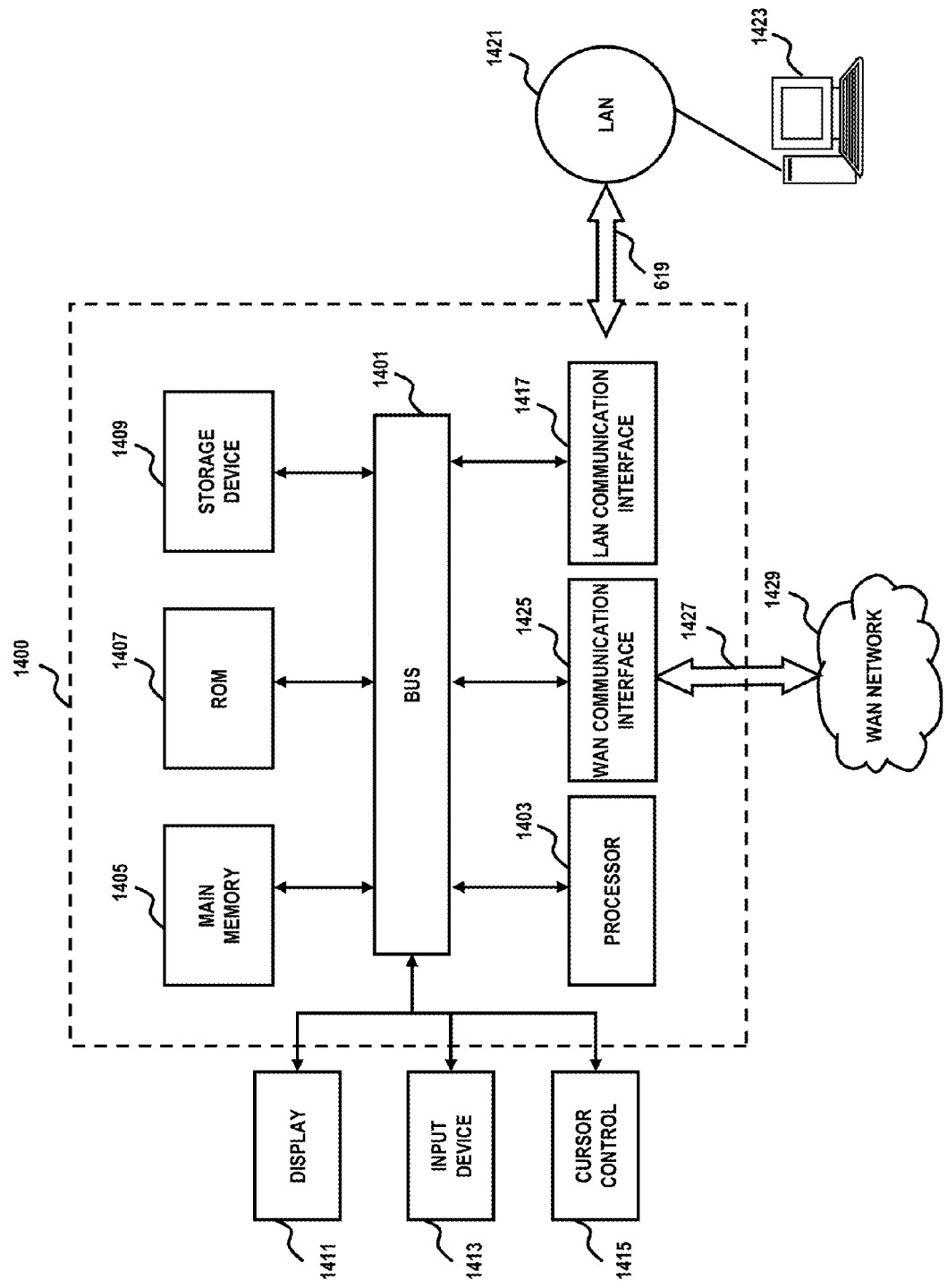
FIG. 14 illustrates computing hardware (e.g., computer system) upon which an embodiment according to the invention can be implemented, according to an exemplary embodiment.

FIG. 14 illustrates computing hardware (e.g., computer system) upon which an embodiment according to the invention can be implemented. The computer system 1400 includes a bus 1401 or other communication mechanism for communicating information and a processor 1403 coupled to the bus 1401 for processing information. The computer system 1400 also includes main memory 1405, such as random access memory (RAM) or other dynamic storage device, coupled to the bus 1401 for storing information and instructions to be executed by the processor 1403. Main memory 1405 also can be used for storing temporary variables or other intermediate information during execution of instructions by the processor 1403. The computer system 1400 may further include a read only memory (ROM) 1407 or other static storage device coupled to the bus 1401 for storing static information and instructions for the processor 1403. A storage device 4109, such as a magnetic disk or optical disk, is coupled to the bus 1401 for persistently storing information and instructions.

The computer system 1400 may be coupled via the bus 1401 to a display 1411, such as a cathode ray tube (CRT), liquid crystal display, active matrix display, or plasma display, for displaying information to a computer user. An input device 1413, such as a keyboard including alphanumeric and other keys, is coupled to the bus 1401 for communicating information and command selections to the processor 1403. Another type of user input device is a cursor control 1415, such as a mouse, a trackball, or cursor direction keys, for communicating direction information and command selections to the processor 1403 and for controlling cursor movement on the display 1411.

According to an embodiment of the invention, the processes described herein are performed by the computer system 1400, in response to the processor 1403 executing an arrangement of instructions contained in main memory 1405. Such instructions can be read into main memory 605 from another computer-readable medium, such as the storage device 1409. Execution of the arrangement of instructions contained in main memory 1405 causes the processor 1403 to perform the process steps described herein. One or more processors in a multi-processing arrangement may also be employed to execute the instructions contained in main memory 1405. In alternative embodiments, hard-wired circuitry may be used in place of or in combination with software instructions to implement the embodiment of the invention. Thus, embodiments of the invention are not limited to any specific combination of hardware circuitry and software.

The computer system 1400 also includes a communication interface 1417 coupled to bus 1401. The communication interface 1417 provides a two-way data communication coupling to a network link 1419 connected to a local network 1421. As an example, communication interface 1417 may be a local area network (LAN) card (e.g. for Ethernet™) to provide a data communication connection to a compatible LAN. Wireless links can also be implemented. In any such implementation, communication interface 1417 sends and receives electrical, electromagnetic, or optical signals that carry digital data streams representing various types of information. Further, the communication interface 1417 can include peripheral interface devices, such as a Universal Serial Bus (USB) interface, a PCMCIA (Personal Computer Memory Card International Association) interface, etc. Although a single communication interface 1417 is depicted in FIG. 14, multiple communication interfaces can also be employed.

The network link 1419 typically provides data communication through one or more networks to other data devices. For example, the network link 1419 may provide a connection through local network 1421 to a host computer 1423, which has connectivity to a network 1425 (e.g. a wide area network (WAN) or the global packet data communication network now commonly referred to as the "Internet") or to data equipment operated by a service provider. The local network 1421 and the network 1425 both use electrical, electromagnetic, or optical signals to convey information and instructions. The signals through the various networks and the signals on the network link 1419 and through the communication interface 1417, which communicate digital data with the computer system 1400, are exemplary forms of carrier waves bearing the information and instructions.

The computer system 1400 can send messages and receive data, including program code, through the network(s), the network link 1419, and the communication interface 1417. In the Internet example, a server (not shown) might transmit requested code belonging to an application program for implementing an embodiment of the invention through the network 1425, the local network 1421 and the communication interface 1417. The processor 1403 may execute the transmitted code while being received and/or store the code in the storage device 1409, or other non-volatile storage for later execution. In this manner, the computer system 1400 may obtain application code in the form of a carrier wave.

The term "computer-readable medium" as used herein refers to any medium that participates in providing instructions to the processor 1403 for execution. Such a medium may take many forms, including but not limited to non-volatile media, volatile media, and transmission media. Non-volatile media include, for example, optical or magnetic disks, such as the storage device 1409. Volatile media include dynamic memory, such as main memory 1405. Transmission media include coaxial cables, copper wire and fiber optics, including the wires that comprise the bus 1401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

TABLE 1

GLOSSARY

| Acronym/ Abbreviation | Description |
| --- | --- |
| CDR | Call Detail Record |
| FPMN | Foreign Public Mobile Network (partner network) |
| GMSC | Gateway MSC |
| GPRS | General Packet Radio Service |
| GT | Global Title |
| HLR | Home Location Register |
| HPMN | Home Public Mobile Network |
| IMSI | International Mobile Subscriber Identity (of HPMN) - |
| MAP | Message Application Part - from GSM 09.02 GSM Standards |
| MGT | Mobile Global Title (derived from IMSI) (E.214) |
| MMS | Multimedia Messaging Service |
| MO | Mobile Originated |
| MSC | Mobile Switching Center |
| MSISDN | Mobile Subscriber ISDN Number (phone number) |
| MSISDN_H | Home MSISDN of MultiLine Subscriber |
| MSISDN_F | Foreign MSISDN of MultiLine Subscriber |
| MSRN | Mobile Station Roaming Number |
| MT | Mobile Terminated |
| NDC | Network Destination Code |
| PRN | Provide Roaming Number MAP message |
| SCCP | Signaling Capabilities and Control Part |
| SG | Signaling Gateway |
| SIMM-R | Single IMSI Multiple MSISDN - Roaming |
| SMS | Short Message Service |
| SMSC | Short Message Service Center |
| SRI | Send Routing Information MAP message |
| SRGF | Signaling Relay Gateway Framework |
| SS7 | Signaling System 7 |
| USSD | Unstructured Supplementary Services Data |
| VLR | Visited Location Register |
| VMSC | Visited Mobile Switching Center |
| MSC_H | Serving VMSC in HPMN |
| VMSC-V | Serving VMSC in VPMN |
| VPMN | Visited Public Mobile Network |

What is claimed is:

1. A method comprising:
   provisioning a communication device with a plurality of communication access numbers respectively associated with a plurality of communication service regions, wherein the plurality of communication access numbers are associated with a single subscriber identity module (SIM) of the communication device;
   selecting a target communication access number, from among the plurality of communication access numbers, based on a location of the communication device, such that the selected target communication access number is associated with a communication service region, of the plurality of communication service regions, that correspond to the location of the communication device;
   initiating a communication session, with a called device, based on the selected target communication access number; and
   selecting a second communication access number, from among the plurality of communication access numbers, associated with a communication service region, of the plurality of communication service regions, that corresponds to a local communication access number of the called device, the target communication access number and the second communication access number being different from one another, wherein the initiation of the communication session includes providing the second communication access number to the called device for display at the called device.

2. The method of claim 1, further comprising:
presenting caller identification information, corresponding to the second communication access number, at the called device.

3. The method of claim 1, wherein the plurality of communication access numbers are concurrently active on the communication device for initiating or receiving the communication session.

4. The method of claim 1, further comprising:
detecting a request to register the communication device in a communication network within one of the plurality of communication service regions; and
determining the location of the communication device based on the request, the communication network, or a combination thereof.

5. The method of claim 4, further comprising:
designating one communication access number from among the plurality of communication access numbers as a primary communication access number for the communication device while the device is at the location,
wherein the one communication access number is associated with the one of the plurality of communication service regions.

6. The method of claim 4, further comprising:
in response to the request to register the communication device, presenting an option for selecting the target communication access number from among the plurality of communication access numbers.

7. The method of claim 1, further comprising:
updating a roaming profile for the communication device within a communication infrastructure based on the target communication access number,
wherein the communication session is relayed to or from the communication device based on the roaming profile.

8. The method of claim 1, wherein the plurality of service regions correspond to a plurality of different countries.

9. An apparatus comprising a processor configured to:
provision a communication device with a plurality of communication access numbers respectively associated with a plurality of communication service regions, wherein the plurality of communication access numbers are associated with a single subscriber identity module (SIM) of the communication device, and the plurality of service regions corresponding to a plurality of different countries; and
select a target communication access number, from among the plurality of communication access numbers, based on a location of the communication device, such that the selected target communication access number is associated with a communication service region, of the plurality of communication service regions, that correspond to the location of the communication device;
initiate a communication session, with a called device, based on the selected target communication access number; and
select a second communication access number, from among the plurality of communication access numbers, associated with a communication service region, of the plurality of communication service regions, that corresponds to a local communication access number of the called device, the target communication access number and the second communication access number being different from one another,
wherein the initiation of the communication session includes providing the second communication access number to the called device for display at the called device.

10. The apparatus of claim 9, further configured to:
present caller identification information, corresponding to the second communication access number, at the called device.

11. The apparatus of claim 9, wherein the plurality of communication access numbers are concurrently active on the communication device for initiating or receiving the communication session.

12. The apparatus of claim 9, further configured to:
detect a request to register the communication device in a communication network within one of the plurality of communication service regions; and
determine the location of the communication device based on the request, the communication network, or a combination thereof.

13. The apparatus of claim 12, further configured to:
designate one communication access number from among the plurality of communication access numbers as a primary communication access number for the communication device while the device is at the location,
wherein the one communication access number is associated with the one of the plurality of communication service regions.

14. The apparatus of claim 12, further configured to:
in response to the request to register the communication device, present an option for selecting the target communication access number from among the plurality of communication access numbers.

15. The apparatus of claim 9, further configured to:
update a roaming profile for the communication device within a communication infrastructure based on the target communication access number,
wherein the communication session is relayed to or from the communication device based on the roaming profile.

16. The apparatus of claim 9, wherein the plurality of service regions correspond to a plurality of different countries.

17. A system comprising:
a communication device configured with a subscriber identity module; and
a platform configured to:
provision the communication device with a plurality of communication access numbers respectively associated with a plurality of communication service regions, wherein the plurality of communication access numbers are associated with the subscriber identity module SIM);
select a target communication access number, from among the plurality of communication access numbers, based on a location of the communication device, such that the selected target communication access number is associated with a communication service region, of the plurality of communication service regions, that correspond to the location of the communication device;
initiate a communication session, with a called device, based on the selected target communication access number; and select a second communication access number, from among the plurality of communication access numbers, associated with a communication service region, of the plurality of communication service regions, that corresponds to a local communication access number of the called device, the target communication access number and the second communication access number being different from one another, wherein the initiation of the communication session includes providing the second communication access number to the called device for display at the called device.

18. The system of claim 17, wherein the platform is further configured to:

present caller identification, corresponding to the second communication access number, at the called device.

19. The system of claim 17, wherein the plurality of communication access numbers are concurrently active on the communication device for initiating or receiving the communication session.

20. The system of claim 17, wherein the plurality of service regions correspond to a plurality of different countries.

* * * * *